(12) United States Patent
Irwin

(10) Patent No.: US 7,296,991 B2
(45) Date of Patent: Nov. 20, 2007

(54) ADJUSTABLE EXTRUDER DIE ASSEMBLY DIE LIP ADJUSTMENT APPARATUS

(76) Inventor: Jere F. Irwin, P.O. Box 10668, Yakima, WA (US) 98909-1668

( * ) Notice: Subject to any disclaimer, the term of this patent is extended or adjusted under 35 U.S.C. 154(b) by 0 days.

(21) Appl. No.: 11/298,442

(22) Filed: Dec. 9, 2005

(65) Prior Publication Data

US 2006/0125132 A1   Jun. 15, 2006

Related U.S. Application Data

(60) Provisional application No. 60/634,876, filed on Dec. 10, 2004.

(51) Int. Cl.
 *B29C 47/22* (2006.01)
(52) U.S. Cl. .................. 425/381; 425/465; 425/466
(58) Field of Classification Search ................ 425/192, 425/381, 465, 466, 192 R
See application file for complete search history.

(56) References Cited

U.S. PATENT DOCUMENTS

| | | | | |
|---|---|---|---|---|
| 2,769,200 | A | * | 11/1956 | Longstreth et al. ......... 425/466 |
| 3,349,435 | A | * | 10/1967 | Vanden Bosch ............ 425/466 |
| 3,349,436 | A | * | 10/1967 | Vanden Bosch ............ 425/466 |
| 3,492,694 | A | * | 2/1970 | Morin ........................ 425/466 |
| 3,809,515 | A | * | 5/1974 | Farrell ...................... 425/133.1 |
| 3,937,777 | A | | 2/1976 | Wienand et al. ............. 264/53 |
| 4,128,369 | A | | 12/1978 | Kemerer et al. ............ 425/113 |
| 4,279,857 | A | * | 7/1981 | Feuerherm .................. 425/381 |
| 4,401,612 | A | | 8/1983 | Nehmey et al. .............. 264/53 |
| 4,830,595 | A | | 5/1989 | Bentivoglio et al. ......... 425/143 |
| 4,842,504 | A | | 6/1989 | Bentivoglio et al. ......... 425/143 |
| 4,886,634 | A | | 12/1989 | Strutzel et al. ............. 264/560 |
| 5,658,526 | A | | 8/1997 | Rastogi et al. ............. 264/564 |
| 6,005,013 | A | | 12/1999 | Suh et al. ..................... 521/79 |
| 6,065,953 | A | | 5/2000 | Bentivoglio ................ 425/143 |
| 6,110,404 | A | | 8/2000 | Ligon, Sr. et al. ............ 264/50 |
| 6,406,653 | B1 | | 6/2002 | Blackwelder et al. ....... 264/146 |
| 6,432,337 | B1 | | 8/2002 | Fogarty ....................... 264/51 |
| 2002/0018822 | A1 | | 2/2002 | Krycki ...................... 425/72.1 |
| 2002/0130446 | A1 | | 9/2002 | Krycki ....................... 264/563 |
| 2004/0074554 | A1 | | 4/2004 | Starita ........................ 138/137 |

* cited by examiner

*Primary Examiner*—Robert Davis
*Assistant Examiner*—Joseph Leyson
(74) *Attorney, Agent, or Firm*—Wells St. John P.S.

(57) ABSTRACT

An annular thermoplastic foam extrusion die assembly has a first die body with a first die lip and a second die body with a second die lip. The first die body includes a trench having an undercut, sloped back wall and a circumferential groove opposite the back wall. A plurality of die lip paddles are spaced apart about an annular groove, each with a tip and a heel. The tip is received for pivotal movement in the groove. The heel engages with the back wall as the heel is raised to drive the first die lip toward the second die lip to adjust a local position of the annular die gap formed therebetween. The lifting mechanism raises and lowers each of the paddles individually. The guide member guides each of the die lip paddles for positioning in a radial direction as the paddle is pivotally positioned about the annular groove.

20 Claims, 19 Drawing Sheets

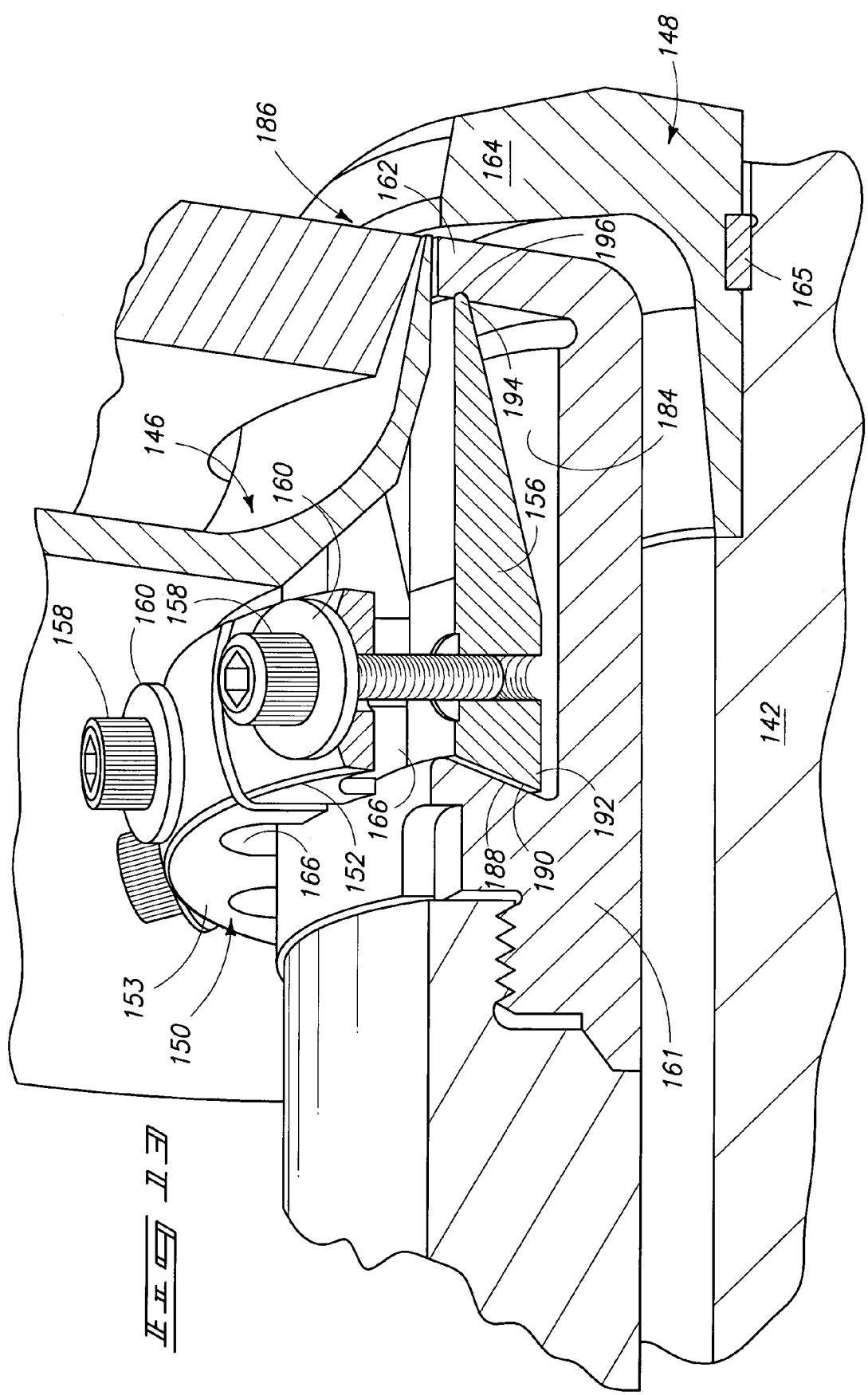

ADJUSTABLE EXTRUDER DIE ASSEMBLY DIE LIP ADJUSTMENT APPARATUS

RELATED PATENT DATA

This application claims priority from U.S. Provisional Patent Application Ser. No. 60/634,876, which was filed Dec. 10, 2004, and which is incorporated by reference herein.

TECHNICAL FIELD

The present invention pertains to polymer foam sheet formation. More particularly, the present invention relates to extruder dies and die lip adjustment apparatus mechanisms for extruder dies and methods.

BACKGROUND OF THE INVENTION

The field of extrusion, and more particularly, the field of thermoplastic foam extrusion, entails many techniques that are utilized in order to generate a uniform thickness product having desirable surface finish features and appropriate dimensional qualities. The ability to fine tune the dimensional qualities and surface finish on a sheet that is generated with an extruder die is a desirable feature.

FIG. 1 illustrates one construction for an extruder die assembly that was implemented in a single commercial device as well as a single test device in the mid-1980s by the present Applicant in an attempt to improve the surface finish and dimensional qualities when forming polymer foam sheet from an extruder die.

As shown in FIG. 1, an annular extruder die assembly 10 is shown mounted to the downstream end of an extruder 12 (similar to extruder 100 shown below with reference to FIG. 2). Die assembly 10 includes a barrel/spider/die assembly 16 comprising a barrel 18, a spider 20, and a die 22 that are joined together and mounted onto an end 14 of extruder 12. A barrel heater spacer 24 is provided about barrel 18. Similarly, a spider clamp ring 26 mounts spider 20 onto barrel 18. A spider heater spacer 28 is mounted about spider 20. A die lip clamp ring 30 mounts die 22 onto spider 20. Additionally, a sheet metal shell 32 forms an enclosure about spacer 24, ring 26, spacer 28, and ring 30. In this manner, a cooling air passage is provided within shell 32 from a source of cooling air 36 that passes through spacer 24, ring 26, spacer 28, and ring 30 where the flow of air exits adjacent an air ring 34. Air ring 34 provides an annular flow of cooling air onto an outer surface of a tubular film of extruded foam material that is being ejected from an annular extruder die.

Spider 20 includes a spider core 38 configured to support a die shaft 42 downstream and coaxially with respect to a bore 40. Spider core 38 is supported by a single radial arm 39 within bore 40. Die shaft 42 mounts onto core 38 via a male threaded portion 44 that is received into a complementary female threaded portion 46 of core 38. An outer die lip collar 48 is seated onto a cylindrical mounting post 50 of shaft 42 via a washer 52 and a jam nut 54. Jam nut 54 is rotated (or loosened) in order to separate collar 48 from an inner die lip 62 when it is necessary to enlarge a die gap between the inner die lip 62 and an outer die lip 64 of collar 48 to clean particles from the die gap.

According to the prior art construction of die assembly 10 of FIG. 1, a plurality of die lip adjuster brackets 56 are mounted in equally circumferentially spaced-apart positions about die 22 via individual threaded adjuster bolts 58. Bolts 58 are each received into a threaded bore 60 in die 22. Accordingly, it is necessary to machine bores 60 into die 22 (which is typically made from hardened steel) at various circumferentially spaced-apart locations thereabout. Bolt 58 is tightened into threaded engagement within bore 60 in order to drive Z-shaped bracket 56 down a frustoconically shaped slope face of die 22 which drives a finger of bracket 56 downwardly and forward into engagement along a radial surface of inner die lip 62. Accordingly, a die gap dimension between lips 62 and 64 can be adjusted at various circumferential locations thereabout by adjusting each respective bolt 58 for each bracket 56 at each circumferential location about die 22.

Several problems are presented by the construction depicted in FIG. 1. First; threaded bores 60 have to be machined into die 22 at various locations. Secondly, another problem is created in that brackets 56 do not apply a bending force onto inner die lip 62 at a constant radial location. The force applied from bracket 56 onto lip 62 acts on a variable fulcrum length when adjusting the die gap between lips 62 and 64. Hence, the radial repositioning of bracket 56 relative to lip 62 imparts a second variable (over the displacement of the fastener) that complicates the adjustment process and makes it more difficult to achieve a desirable and carefully controlled die gap between die lips 62 and 64 at each of the circumferential locations about die lips 62 and 64. It has been found through experience that improvements are still needed in order to increase the controllability and precision available when adjusting the tailoring of a die gap about an entire circumference of an extruder die in order to achieve improved dimensional qualities and surface finish (inner and outer) on a polymer foam sheet of material that is extruded therefrom.

Feedback from the above-described prior art effort identified the need for further improvements in order to further enhance the surface finish and dimensional qualities of a polymer foam sheet being formed by an extruder die. Accordingly, the Applicant has implemented further improvements which are described below in the Detailed Description.

SUMMARY OF THE INVENTION

An annular extruder die assembly is provided with an annular die lip adjustment apparatus and method for fine tuning dimensional qualities and surface finish on a sheet of plastic material, such as a polymer foam sheet. The die lip adjuster apparatus includes a plurality of die lip adjuster paddles that are spaced apart circumferentially within a trench in a radial outer surface of a die body. Each paddle has a tip, or toe, that pivotally seats into an annular groove of an outer die lip. The paddle is manipulated into engagement with a sloped back wall in the die body as the paddle is raised into engagement therewith and then pivoted so as to impart local bending of the die lip in order to adjust a localized die gap between the outer die lip and an inner die lip. A support ring is provided circumferentially about the die body having a plurality of complementary slots for laterally guiding and supporting each respective paddle for radial positioning pivotally about the annular groove in the outer die lip. Each paddle is adjusted in radial position via a threaded bolt that passes through the support ring and into the paddle.

According to one aspect, an annular thermoplastic foam extrusion die assembly has an annular die, a plurality of die lip paddles, a lifting mechanism, and a guide member. The annular die has a first die body with a first die lip and a second die body with a second die lip. The second die body is positioned adjacent the first die body with the second die lip configured relative to the first die lip to form an annular groove therebetween. The first die body includes a trench having an undercut, sloped back wall. The first body has a circumferential groove opposite the back wall. The plurality of die lip paddles are spaced apart about the annular groove. Each die lip paddle has a tip and a heel. The tip is configured to be received for pivotal movement in the groove. The heel is configured to engage with the back wall as the heel is raised to drive the first die lip toward the second die lip to adjust a local position of the annular die gap formed therebetween. The lifting mechanism is configured for raising and lowering each of the, paddles individually. The guide member is configured to guide each of the die lip paddles for positioning in a radial direction as the paddle is pivotally positioned about the annular groove.

BRIEF DESCRIPTION OF THE DRAWINGS

Preferred embodiments of the invention are described below with reference to the following accompanying drawings.

FIG. 13 is an enlarged, partial and sectional perspective view further illustrating the die lip adjustment apparatus in relation to the inner and outer die lips.

DETAILED DESCRIPTION OF THE PREFERRED EMBODIMENTS

Figure 1:
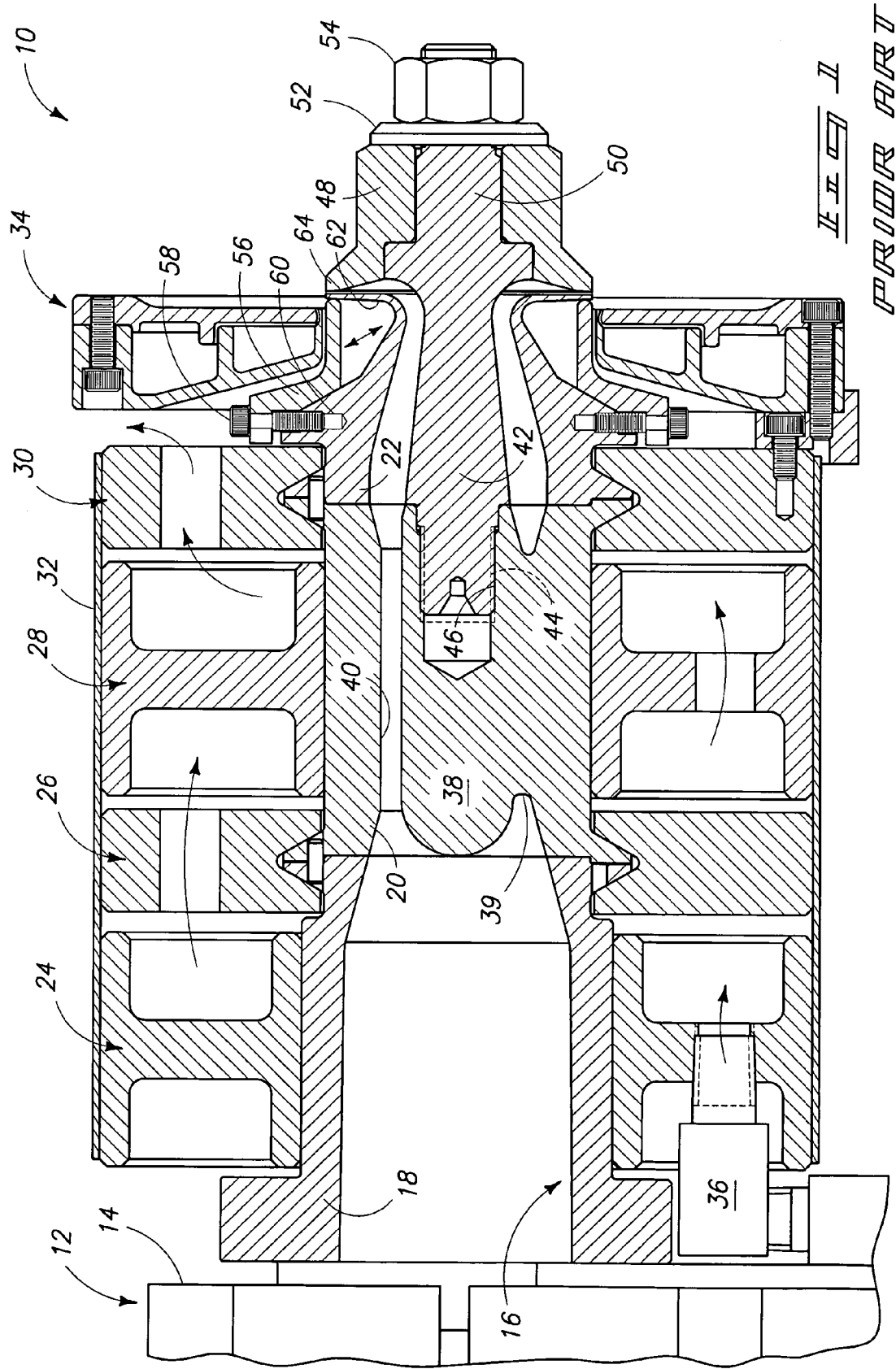
FIG. 1 is a vertical view of a prior art annular extruder die assembly.

This disclosure of the invention is submitted in furtherance of the constitutional purposes of the U.S. Patent Laws "to promote the progress of science and useful arts" (Article 1, Section 8).

Reference will now be made to preferred embodiments of Applicant's invention comprising an annular extruder die assembly identified by reference numeral 110 (see FIGS. 2-14) and 1110 (see FIGS. 15-18). While the invention is described by way of preferred embodiments, it is understood that the description is not intended to limit the invention to such embodiments, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being added to an appendix, as needed, as being presently understood in the art.

FIG. 1 illustrates a thermoplastic foam extrusion assembly typically referred to as an extruder 100 having the provision of an annular extruder die assembly 110 pursuant to the present invention. Extruder 100 is configured to produce an expandable polymer plastic, such as a thermoplastic foam extrusion, in a finished or semi-finished product. One suitable thermoplastic foam extrusion comprises a polystyrene sheet. Annular extrusion die assembly 110 generates a tube of such thermoplastic foam extrusion which is delivered over a cooling mandrel 102 where the tube is cut into an upper and lower sheet and which is then subsequently rolled onto storage rolls (not shown).

It is understood that, in addition to polystyrene, other forms of thermoplastic extrusion can be generated using the annular extrusion die assembly of the present invention. For example, polyethylene (PE), PET, polypropylene, or other similar thermoplastics, including expandable or foaming polymer thermoplastics or other materials, may be generated using the annular die assembly of the present invention.

By way of example, extruder 100 is depicted as a two-stage extruder having a hopper 112 configured to receive material, particularly in the form of pellets, small beads, cubes, blocks, chunks, or flakes of material that is then melted within a melt region of a first stage 114 of extruder 100. A second stage 116 of extruder 100 is provided downstream of first stage 114 and is configured to provide a heat extraction region for the melted material. Further details for the construction of one suitable, two-stage extruder are disclosed in U.S. Pat. No. 6,432,337, herein incorporated by reference.

Figure 3:
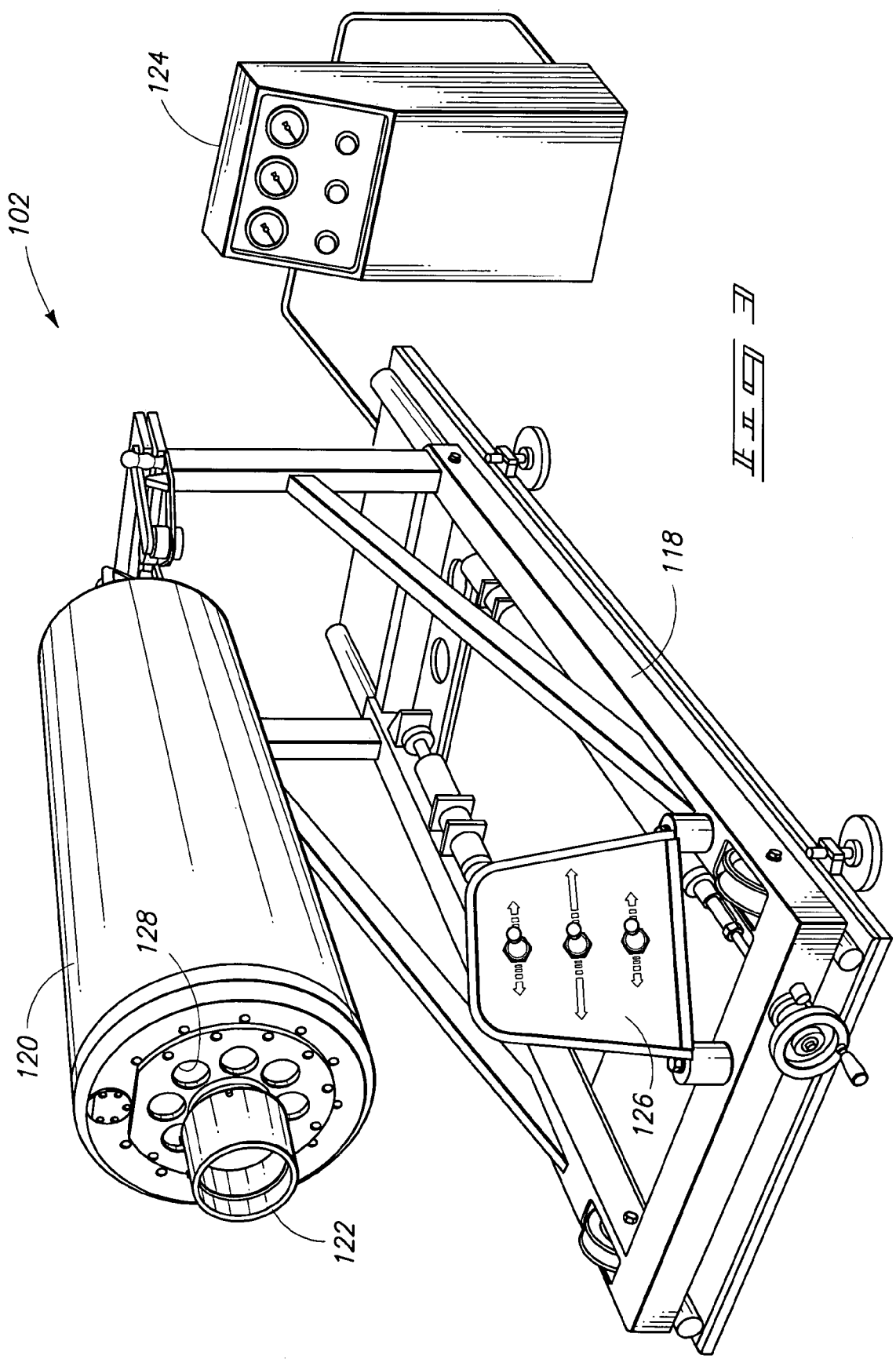
FIG. 3 is an enlarged and simplified perspective view of a cooling mandrel over which a tubular film of extruded foam material is drawn and dimensionally stabilized as well as severed into two sheets.

FIG. 3 illustrates one construction for a suitable cooling mandrel 102 that is positioned downstream of the annular extruder die assembly for stretching, sizing, and cooling a tube of extruded thermoplastic foam. Cooling mandrel 102 is also configured with a pair of knives to slit the tube of thermoplastic foam extrusion at a downstream end in order to generate a top and bottom sheet of such thermoplastic foam extrusion. Cooling mandrel 102 includes a frame 118, a drum 120, a collar 122 that mates with a complementary post 176 (see FIG. 5) provided at a downstream end of an annular extrusion die assembly, an electrical control box 124, a pneumatic control panel 126, and a plurality of adjustable air vents 128 that are configured to generate a flow of cooling air on an inner surface of a tubular thermoplastic extrusion being stretched over drum 120.

Figure 4:
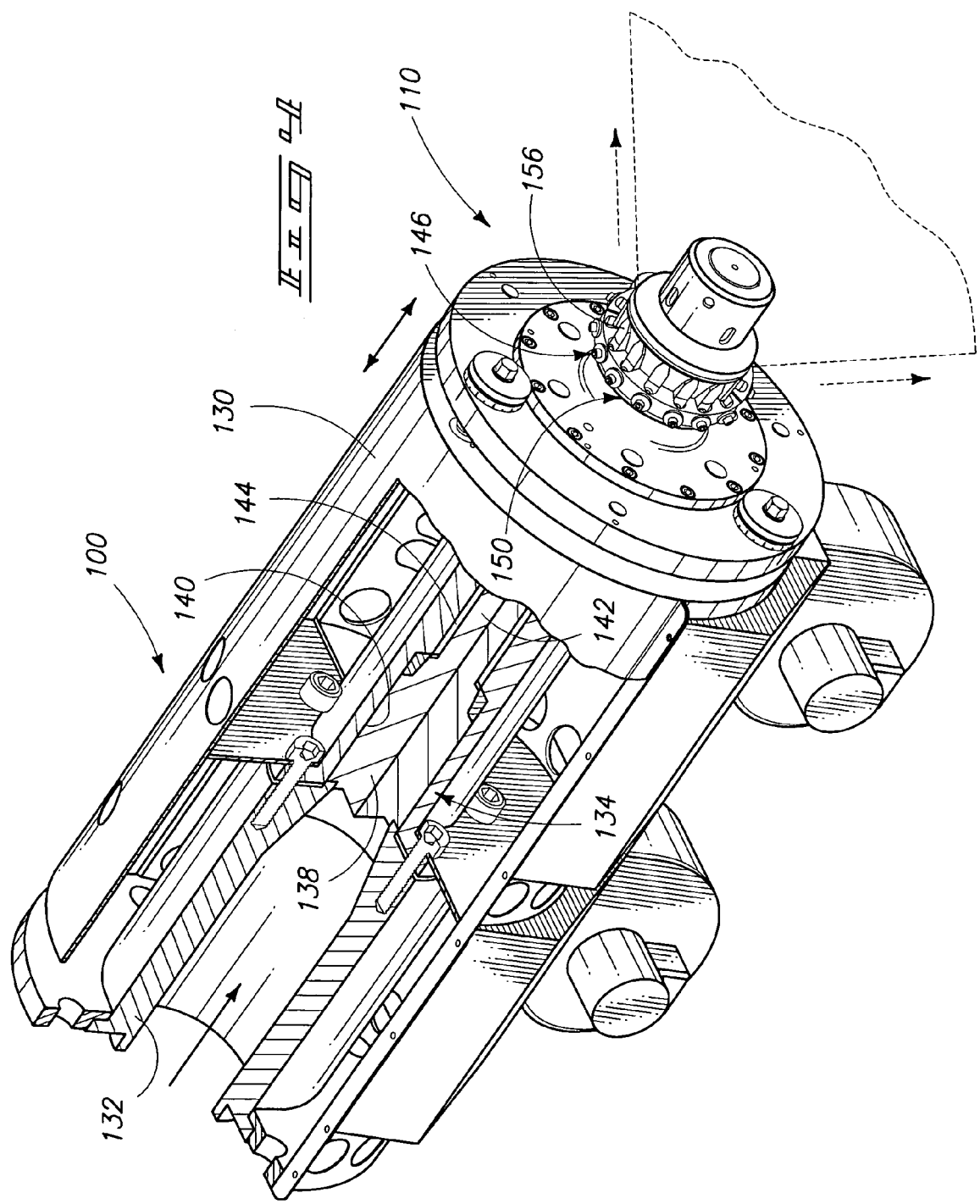
FIG. 4 is a partial perspective and cutaway view of an annular extruder die assembly mounted to the downstream end of an extruder.

FIG. 4 illustrates the positioning of annular extruder die assembly 110 on the downstream end of an extruder 100. Die assembly 110 is provided downstream of a shell 130 in which a barrel 132 and a spider 134 are provided. Spider 134 coaxially supports a die shaft 136 via a spider core 138 coaxially within a bore 144. Spider core 138 is supported via a plurality of spider arms 140 that extend radially from core 138. Die shaft 142 extends downstream from spider core 138.

Die assembly 110 provides a benefit over the prior art construction in FIG. 1 in that a die lip adjustment apparatus 146 enhances the ability to control dimensional characteristics and surface finish in a tubular thermoplastic foam extrusion that is ejected therefrom. More particularly, an adjuster support ring 150 extends circumferentially about a die body 161 to support a plurality of die lip adjuster paddles, or wedges, 156 that are circumferentially spaced apart in equidistance and relation from each other about die body 161. Each adjuster paddle 156 can be adjusted via a threaded adjuster bolt 158 and a washer 160 to coact against a respective ring member 152-154 of support ring 150 to locally deform an inner die lip 162 in relation to an outer die lip 164 of an outer die lip collar 148.

By tightening fastener 158 and raising a rear portion of paddle 156, outer die lip 162 is locally deformed towards inner die lip 164, which reduces the die gap locally therebetween. By monitoring the thickness of a tube of thermoplastic foam extrusion being generated via a corresponding annular die gap 180, individual paddles 156 can be adjusted at selected circumferential locations about annular die gap 180 in order to adjust die gap 180 to realize a more uniform and consistent thickness of material being generated therefrom. Paddle 156 applies lateral force to outer die lip 162 at a constant radial location which creates a constant length fulcrum arm. This leads to more controlled application of bending force onto die lip 162.

Figure 5:
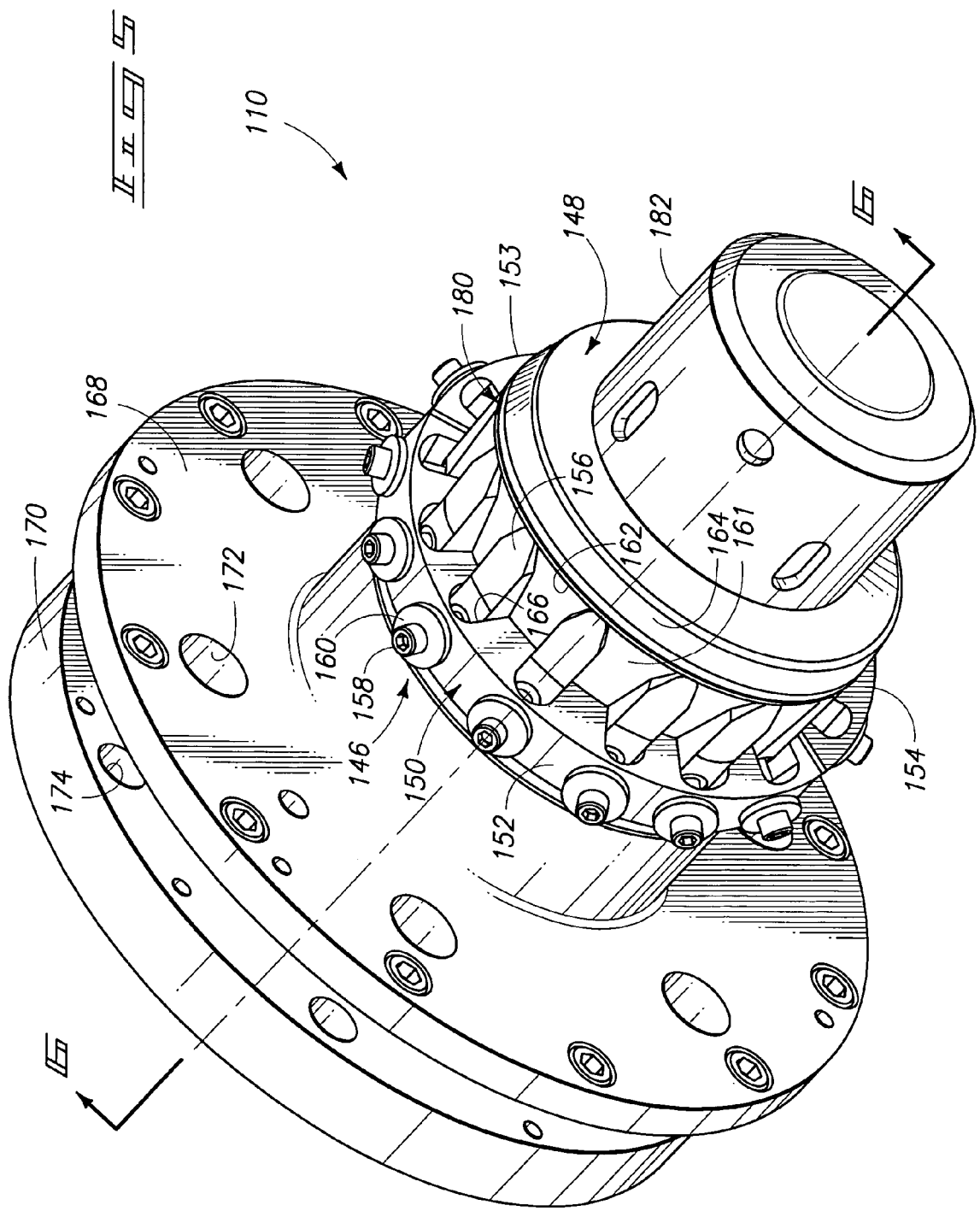
FIG. 5 is an enlarged perspective view of the die assembly of FIG. 4, but with components removed.

As shown in FIG. 5, each die lip adjuster paddle 156 is accurately positioned in a circumferential location about die body 161 via slot 166 for guided displacement in a radial direction at a first, or heel, end and also in pivotal relation at a proximal, or tip, end (via groove 196). A tip end of each paddle 156 is pivotally supported against die lip 162 by seating the tip end within an annular groove 196 (see FIG. 7). In this manner, a substantially lateral force is generated against lip 162 when paddle 156 is elevated into engagement at a rearmost end via tightening of fastener 158 into sloped back wall 188. This action laterally biases die lip 162 towards die lip 164, thereby decreasing the local dimension of annular die gap 180. The provision of individual slots 166 serves to stabilize and guide the radial adjustable positioning of the rearward portion of each respective paddle 156. Such controlled positioning, which constrains the pivotal repositioning of paddle 156 in a radial direction, allows for a more finely tailored adjustment of the annular die gap in a region locally of each paddle 156.

Figure 8:
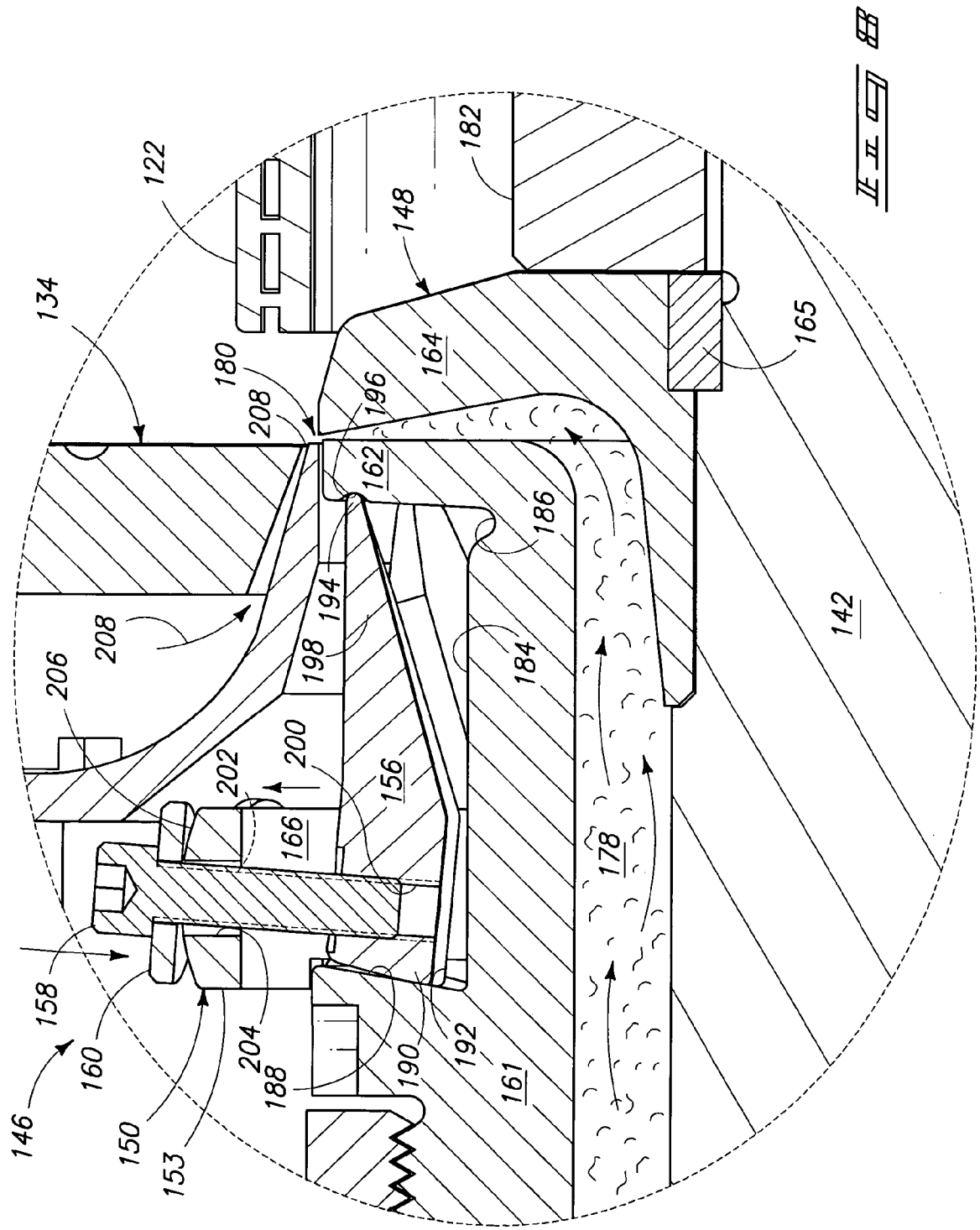
FIG. 8 is an enlarged section view taken within the encircled region 8 of FIG. 6 corresponding with that shown in FIG. 7, but illustrating the lip adjuster assembly positioned so as to further close an annular die gap.

As shown in FIG. 8, a pair of circumferential flange plates 168 and 170 are also shown. Plate 168 is moved in unison with die body 160 and outer die lip 162 as pneumatic actuators are mounted on additional mounting surfaces (not shown) that extend between plates 168 and 170. Relative motion between plates 168 and 170 imparts relative motion between die lips 162 and 164. One reason for imparting such relative movement is caused when it is desirable to open up the annular die gap 180 in order to clean contaminants that may have been lodged therein and delivered through an extruder within a liquid thermoplastic foam extrusion. Further details of such construction and movement are illustrated below with reference to FIGS. 6 and 11.

Figure 11:
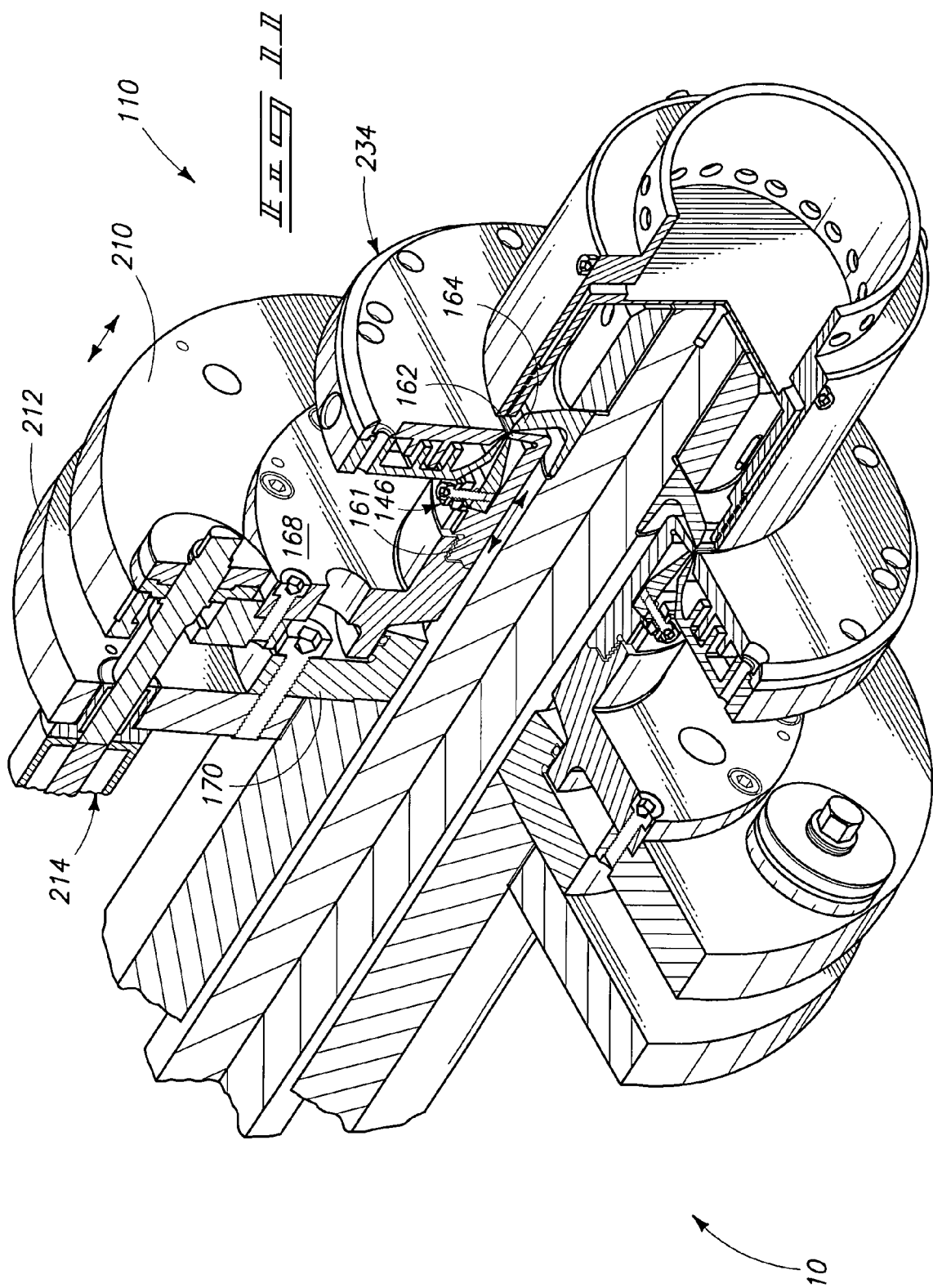
FIG. 11 is a partial sectional view of selected downstream components on an extruder and further illustrating construction of an annular extruder die assembly mounted onto a downstream end of the extruder.

To facilitate the mounting of additional actuator components onto flange plates 168 and 170, bores 172 and 174, respectively, are circumferentially spaced thereabout for securing flange plates 210 and 212, respectively (see FIG. 11), via fasteners. As shown in FIG. 11, a pneumatic cylinder 214 is used to extend and retract flange plates 210 and 212 relative therebetween to open and close the die gap (or adjust total width).

Outer die lip collar 148 is axially loaded onto a die shaft 142 (see FIG. 6) at a selected axial location with a cylindrical key 165, after which cap 182 is threadingly received onto shaft 142.

Figure 6:
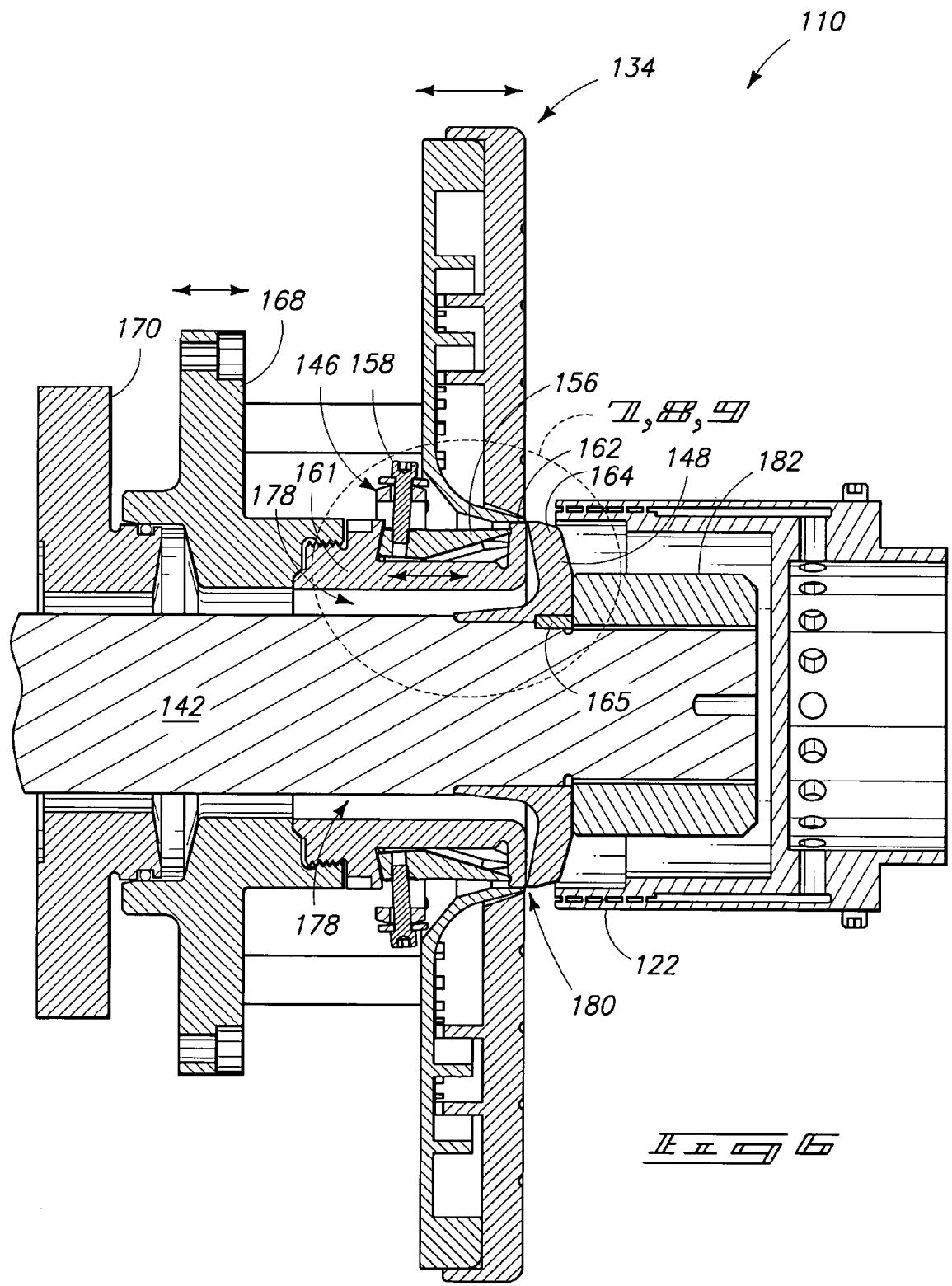
FIG. 6 is a vertical sectional view taken along line 6-6 of FIG. 5 and further illustrating the die assembly.

As shown in FIG. 6, an annular gap 178 is provided between die shaft 142 and die body 161. Melted thermoplastic foam material is delivered through annular gap 178 where it exits via annular die gap 180 between die lips 162 and 164.

Figure 7:
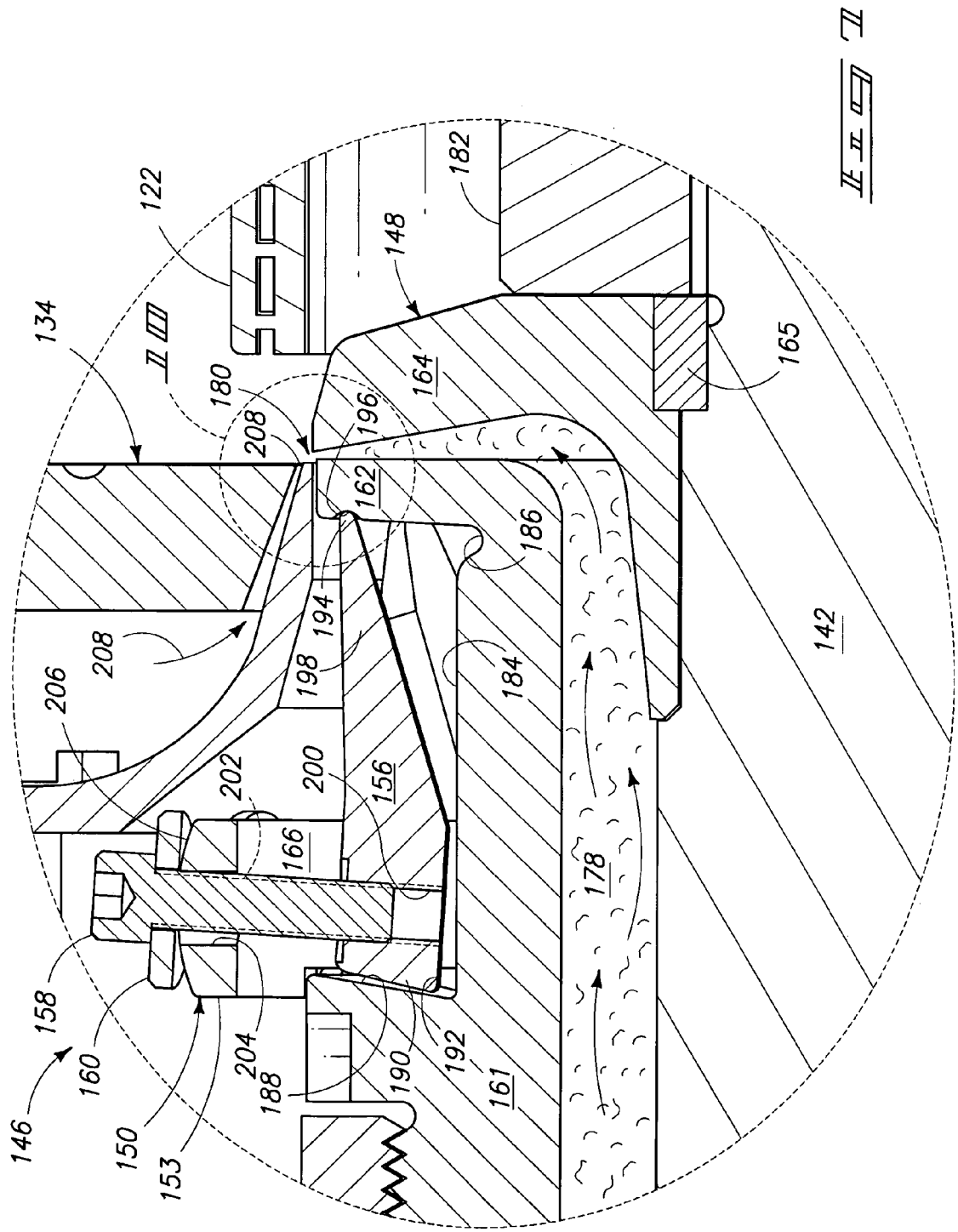
FIG. 7 is an enlarged sectional view taken from the encircled region 7 of FIG. 6 showing a lip adjuster assembly in a relatively open position.

FIG. 7 illustrates in enlarged sectional view further construction details for the lip adjustment apparatus of the present invention. More particularly, die body 161 includes a trench 184 that extends circumferentially and radially inwardly into die body 161. Trench 184 includes a circumferential relief groove 186 that forms a relief where outer die flange 162 turns radially outwardly and circumferentially thereabout. Die body 161, opposite die lip 162, includes a sloped back wall 188 that decreases in distance relative to die lip 162 while moving radially outwardly from trench 184 (i.e., undercut). Additionally, each die lip adjuster paddle 156 includes a sloped back face 190 that engages with back wall 188 as a rear portion of paddle 156 is raised via tightening of threaded fastener 158 against a top, or rounded circumferential cap surface, 206 of support ring 150. Die lip adjuster paddle 156 includes a threaded bore 200 that complementarily mates in threading engagement with a threaded portion 202 on adjuster bolt 158. Tightening of bolt 158 thereby raises a rear portion of paddle 156, while a tip, or toe, 194 pivots within an annular groove 196 in die lip 162. As a rear portion of paddle 156 is raised via bolt 158, a heel 192 on paddle 156 begins to forcibly engage against sloped-back wall 188, which drives tip 194 forcibly and axially into groove 196 which concomitantly axially biases die lip 162 into closer proximity with die lip 164, thereby narrowing annular die gap 180 locally of paddle 156. By adjusting each paddle 156 that is circumferentially positioned about die gap 180, the local dimensions of annular die gap 180 can be adjusted about the entire circumference of die lips 162 and 164 in order to achieve a desired dimensional (thickness) tubular product being ejected therefrom via delivery of melted material from annular gap 180 during an extrusion of a thermoplastic film therefrom.

As shown in FIG. 7, paddle 156 includes a tapering finger 198 that extends from a distal end of paddle 156 toward tip 198.

Additionally, fastener 158 is pivotally supported atop cap 206 of ring 150 via a washer 160. Fastener 158 passes through an oversized bore 204 that facilitates pivotal positioning of bolt 158. This construction facilitates the pivotal raising and lowering of paddle 156 about annular groove 196 via tip 194. Accordingly, tip 194 maintains a constant radial position within groove 196 as paddle 156 is raised and lowered, which provides for a more controlled adjustment of gap 180 between die lips 162 and 164 via tightening and loosening of bolt 158. Additionally, a rear portion of paddle 156 is further guided for elevational support within slot 166 which prevents any lateral displacement of paddle 156 as a rear portion of paddle 156 is being raised and lowered. Such feature further improves the stability and enhances the ability to finely adjust a die gap 180 which results in a concomitant fine adjustment for product thickness and surface finish. When paddles 156 are engaged into groove 196, ring members 152-154 are forced into engagement with trench 184 which supports them there along.

FIG. 7 illustrates paddle 156 after placement into trench 184 and tip 194 into groove 196, but before fastener 158 is tightened to engage heel 192 into abutment with sloped-back wall 188.

FIG. 8 illustrates die lip adjuster assembly 146 after tightening bolt 158 so as to engage heel 192 against sloped-back wall 188. Accordingly, the rear portion of paddle 156 is elevated away from trench 184. As this happens, paddle 156 pivots about groove 196 as tip 194 is pivotally supported in groove 196.

Figure 9:
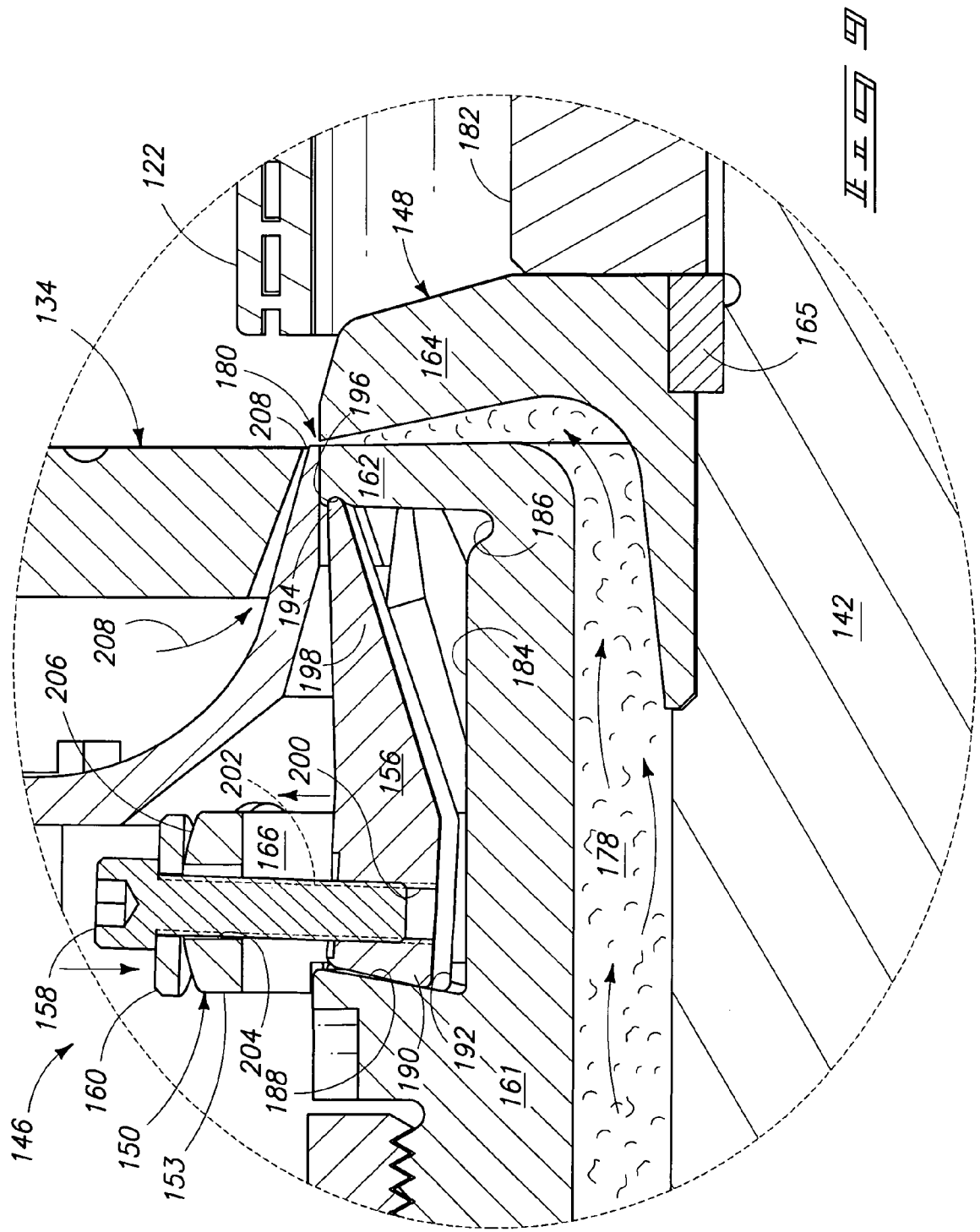
FIG. 9 is an enlarged section view taken within the encircled region 9 of FIG. 6 corresponding with that shown in FIG. 7, but illustrating the lip adjuster assembly positioned in an even further closed annular die gap.

FIG. 9 illustrates further tightening of fastener 158 so as to pivotally reposition paddle 156 further relative to groove 196 and further raise a rear portion of paddle 156, thereby further engaging heel 192 into engagement with upper portions of sloped-back wall 188. The further heel 192 is raised into engagement with undercut back wall 188, the further tip 194 laterally biases die lip 162 toward die lip 164. As shown in FIG. 9, annular die gap 180 is reduced in thickness, in a local region, relative to die gap 80 depicted in FIGS. 7 and 8.

Figure 10:
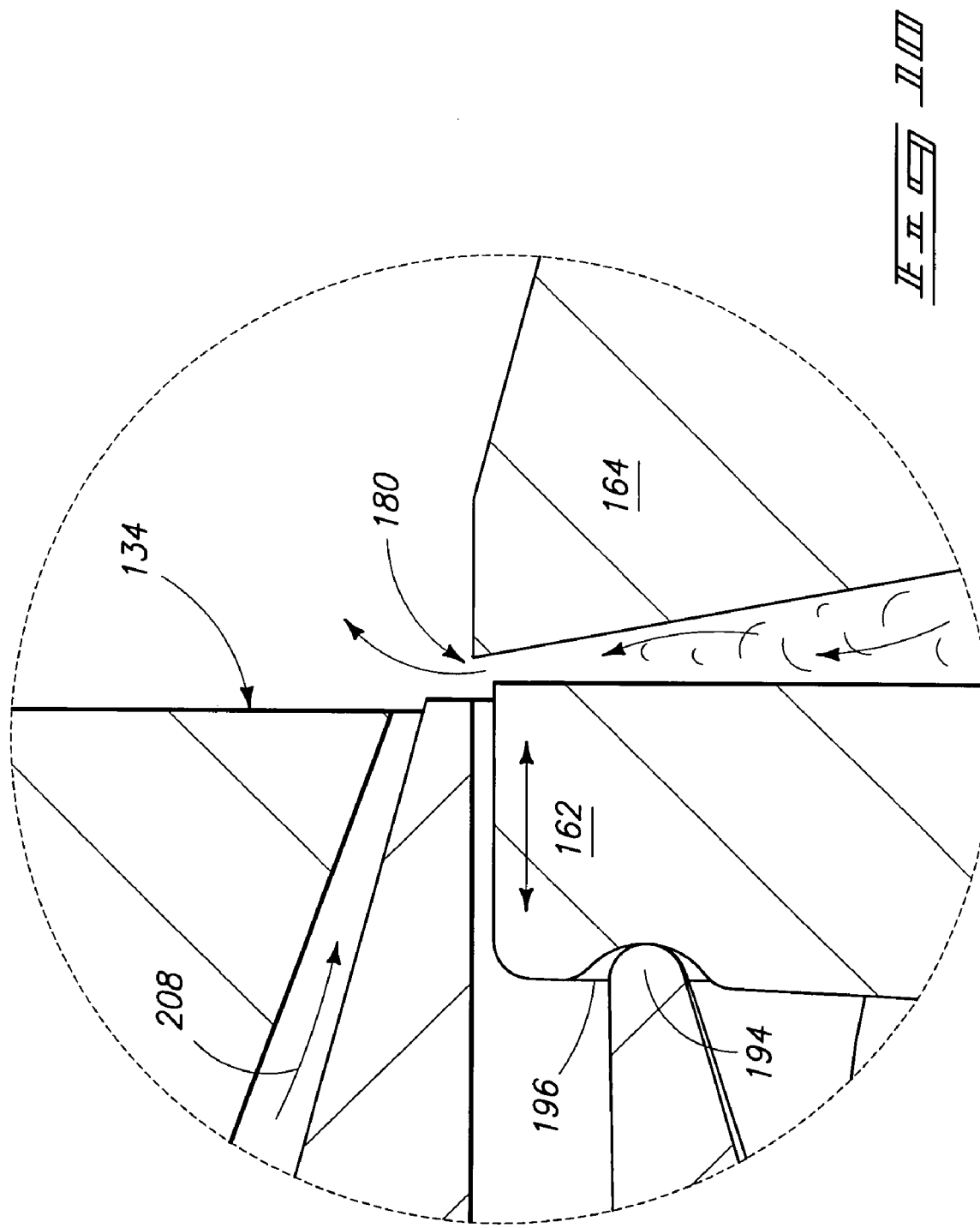
FIG. 10 is a further enlarged sectional view taken from within the encircled region 10 of FIG. 7 illustrating positioning of the inner and outer die lips so as to define a desired annular die gap.

FIG. 10 illustrates in enlarged sectional view the relationship of tip 194 within annular groove 196. As tip 194 is forced in a rightward direction (due to engagement of the paddle heel against the sloped-back wall of the die body), outer die lip 162 is urged towards die lip 164 so as to decrease the thickness of annular die gap 180 in the local vicinity of tip 194. By individually adjusting each paddle around the circumference of the die lip 162, the thickness of die gap 180 about the entire circumference can be adjusted in order to achieve a uniform thickness of extruded thermoplastic foam material.

FIG. 11 further illustrates the construction of lip adjuster assemblies 146 for annular extrusion die assembly 110. The downstream portion of extruder 10 is shown partially (with additional components omitted) and in sectional view along with extruder die assembly 110 to facilitate better understanding of the construction and assembly details.

Figure 2:
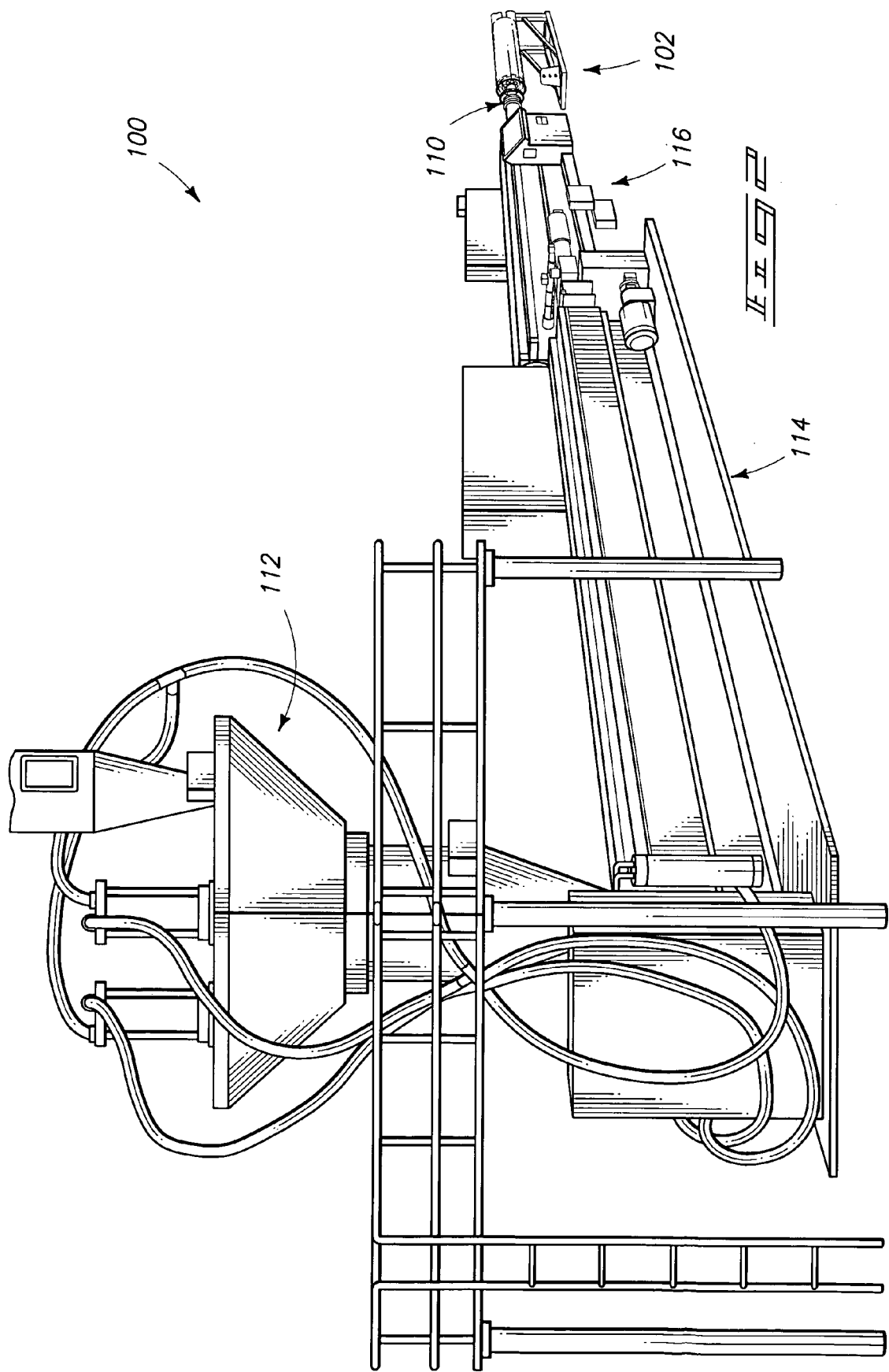
FIG. 2 is a perspective, simplified view of an extruder with an annular extruder die assembly of the present invention.
Figure 12:
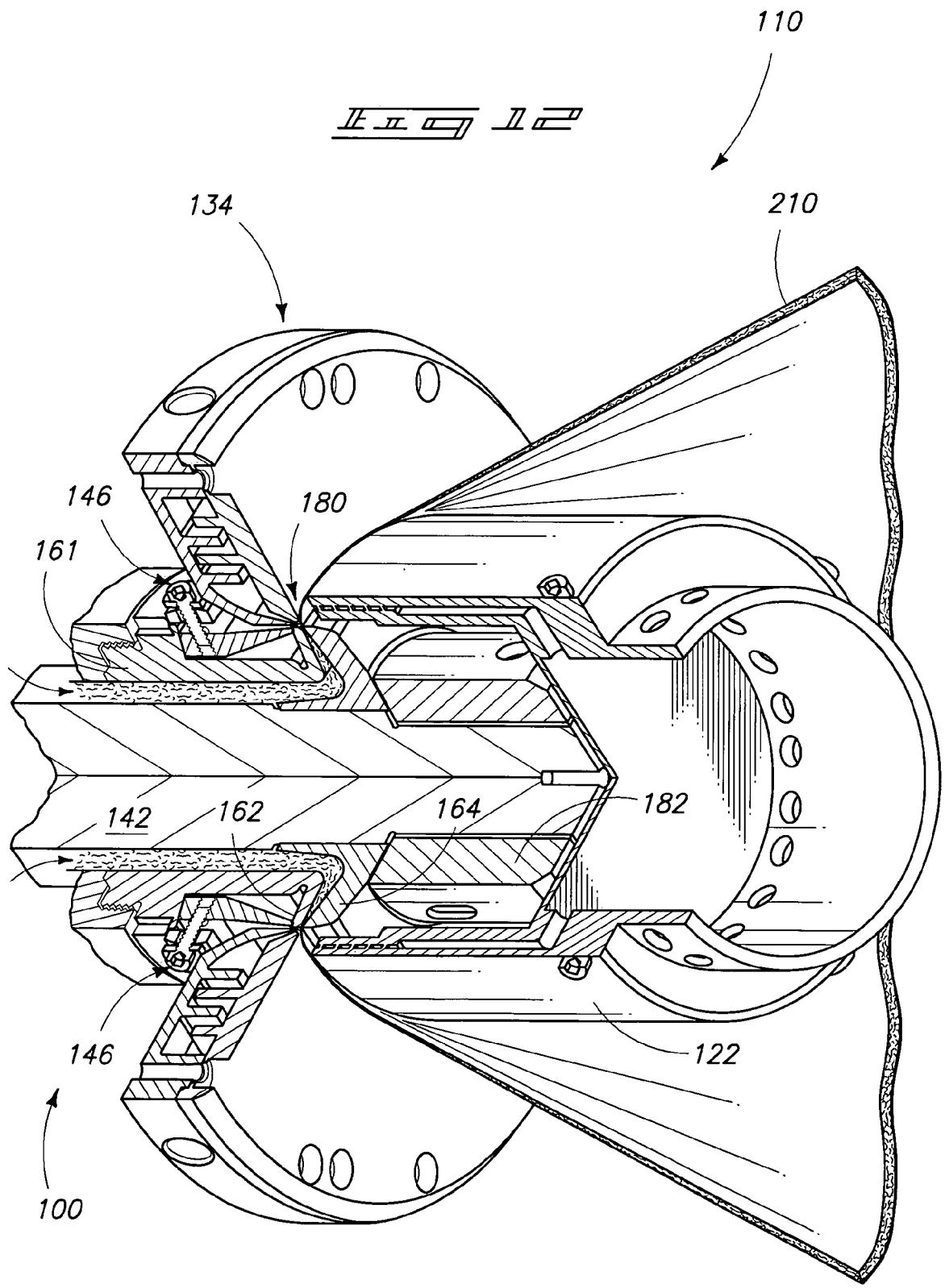
FIG. 12 is a further enlarged partial sectional view of the annular extruder die assembly of FIG. 11 but illustrating generation of a tubular sheet that is being delivered from the annular die gap.

FIG. 12 illustrates extruder die assembly 110 positioned at the downstream end of an extruder 100 while extruding thermoplastic foam material so as to form a tube of material that is subsequently stretched, shaped, and cooled over a cooling mandrel (see FIGS. 2 and 3). The tube of thermoplastic foam material is extruded under pressure via annular die gap 180 where the material then expands to form a tube of sheet material that is subsequently sliced on opposed lateral edges to form an upper and lower sheet that is then subsequently stored on rolls.

FIG. 13 illustrates a partial perspective and sectional view depicting die lip adjustment apparatus 146. More particularly, die lip adjustment apparatus 146 includes a plurality of circumferentially spaced-apart adjuster paddles that are guided along a rear portion for axial radial outward and inward displacement via slots 166 provided in support ring 150. As shown in FIG. 13, tips (or fingers) 194 form arcuate paddle-shaped tips that mate in complementary engagement within an arcuate section of annular groove 196. By tightening bolt 158, a rear portion of paddle 156 is raised so as to engage heel 192 against sloped-back wall 188.

It is understood that die lip adjuster paddles 156 are each formed to have an arcuate shape that substantially corresponds with the arcuate shape of the die body 166 in a similar radial position. For example, tip 194 has an arcuate contact surface that complements and corresponds with the arcuate shape of annular groove 196 in adjacent contact therewith. Likewise, the top and bottom surfaces or paddle 156 have a similar arcuate configuration that complements the shape of die body 166 at a respective radial location relative to the extruder die. For example, heel 192, in a lateral direction, forms an arcuate contact line that complements the arcuate shape of sloped-back wall 188 that corresponds with the arcuate shape of die body 161.

According to one construction, paddles 156 are machined from a solid block of cylindrical stock material, such as case hardened 86L20 steel. Likewise, die body 161 is also constructed from a machine and case hardened block of A2 tool steel. Similarly, outer die lip collar 148 is also constructed from a machined piece of 1018 low carbon steel with a zinc coating. Bolts 158 are Grade B socket head cap screws.

According to one construction, annular die gap 180 has a typical thickness (or width) between lips 162 and 164 of 0.021 inches. Also according to one construction, annular die gap 180 is constructed to have a diameter of 5.595 inches. However, it is understood that alternative dimensions and materials can also be utilized in constructing the various components of the die lip adjuster assembly and the annular extrusion die assembly.

Figure 14A:
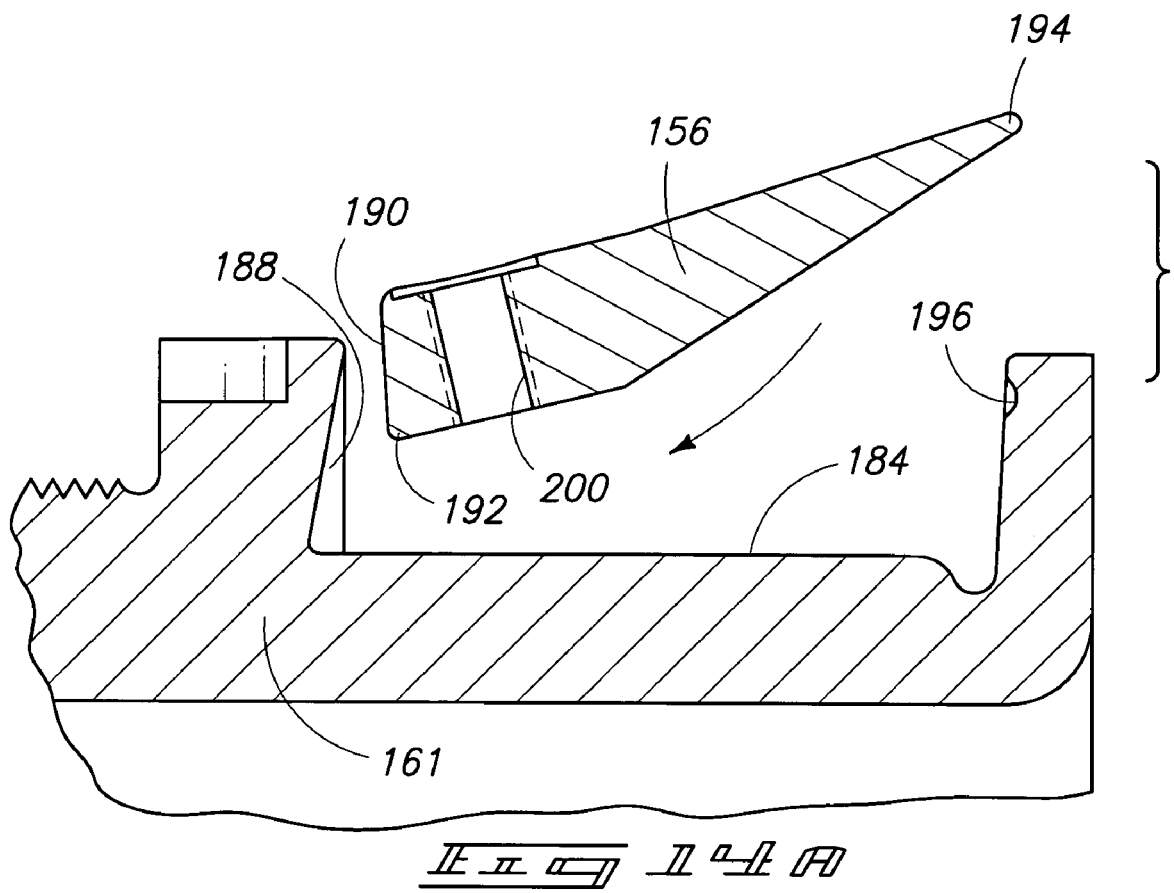
FIG. 14A is a partial, vertical sectional view showing assembly of a die lip adjuster paddle into a circumferential trench within a die lip adjustment apparatus.
Figure 14B:
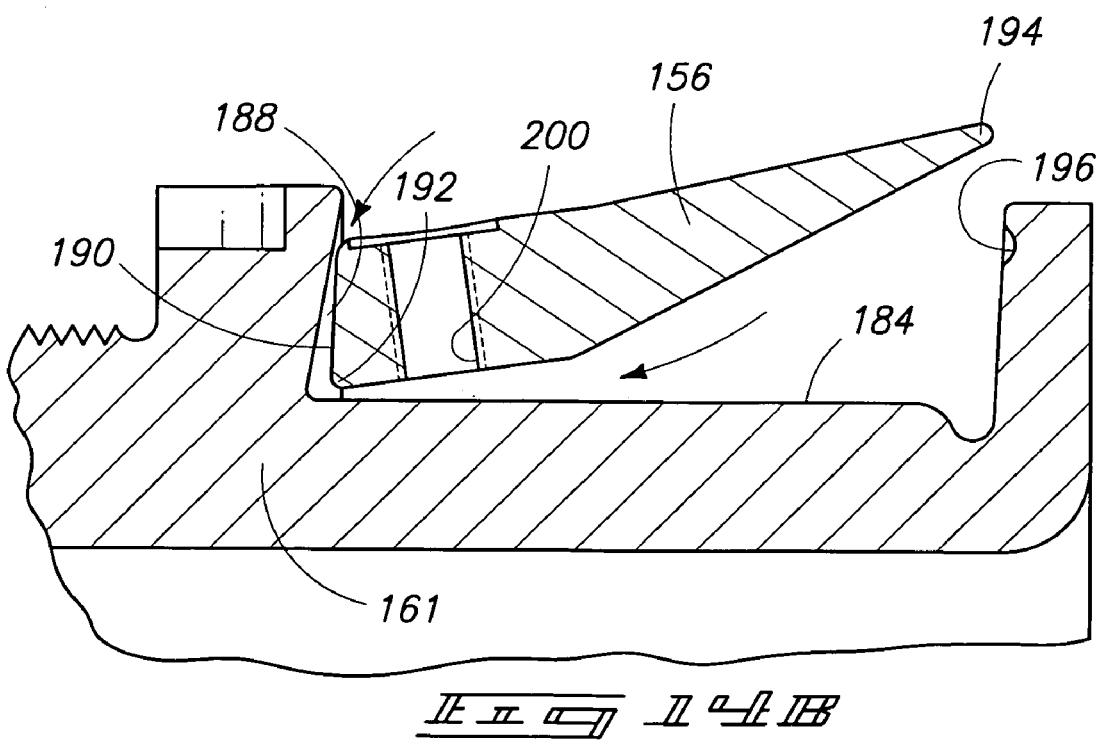
FIG. 14B is a partial, vertical sectional view showing insertion of the paddle into a circumferential trench within a die lip adjustment apparatus.
Figure 14C:
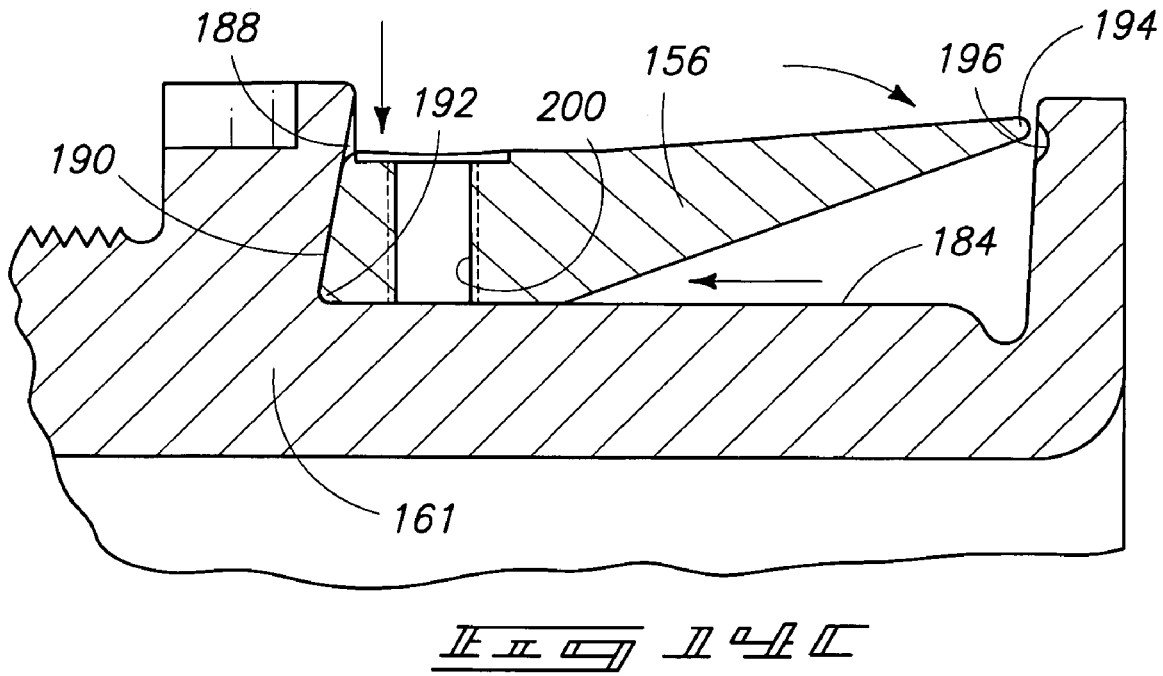
FIG. 14C is a partial, vertical sectional view showing repositioning of the paddle later in time than that depicted in FIG. 14B to position the tip relative to an annular groove.
Figure 14D:
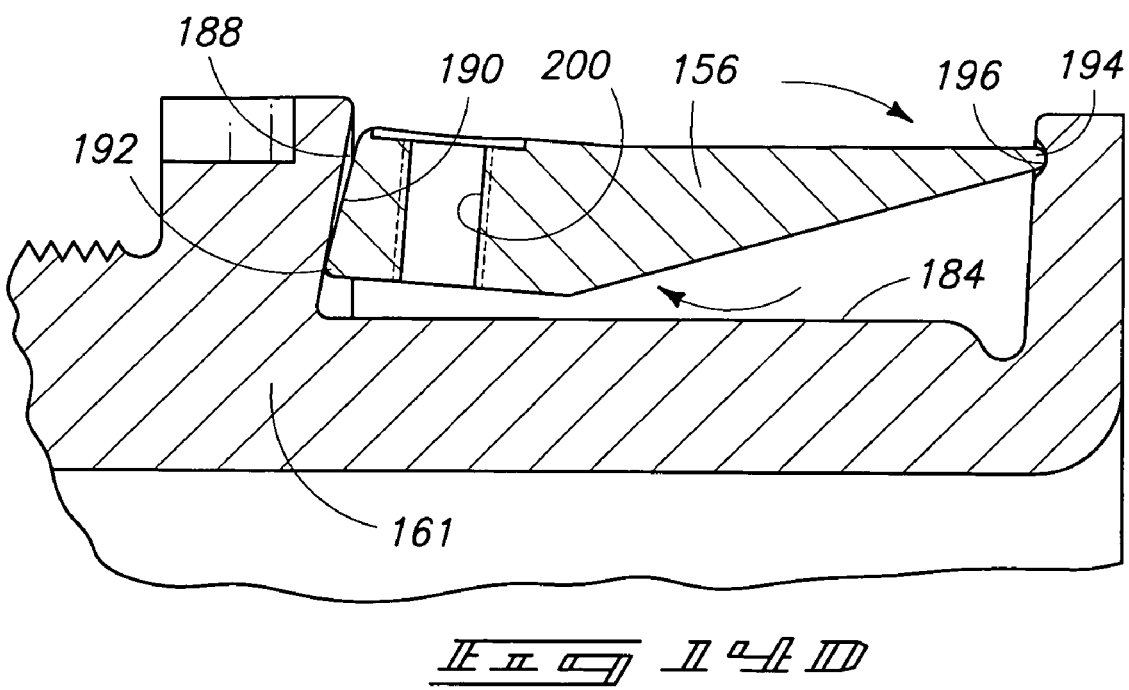
FIG. 14D is a partial, vertical sectional view showing repositioning of the paddle when the tip is seated into the groove when attempting to close and locally narrow the outer die lip.

FIGS. 14A-14D illustrate the various sequential steps involved in placing individual die lip adjuster paddles 156 within trench 184 of die body 161. More particularly, FIG. 14A illustrates the manner in which a paddle 156 is positioned into trench 184 by dropping the heel 192 downwardly into trench 184. Subsequently, as heel 192 is cleared into trench 184, and beneath and alongside sloped-back wall 188, tip 194 is brought downwardly into the position shown in FIG. 14C. Finally, tip 194 is brought into annular groove 196, after which heel 192 can be raised upwardly into engagement with sloped-back wall 188 via tightening of the respective threaded fastener (not shown).

FIGS. 15-18 illustrate an alternative construction annular extruder die assembly 1110 that can be substituted for assembly 110 on extruder 100 of FIGS. 2 and 4-14. More particularly, extruder die assembly 1110 differs from assembly 110 in that the inner die lip of assembly 1110 is moved while the outer die assembly is held stationary. In contrast, the outer die assembly of assembly 110 is moved while the inner die assembly is held stationary. Furthermore, the die lip adjustment apparatus of extruder die assembly 1110 has a modified geometry over the die lip adjustment apparatus of extruder die assembly 110.

Figure 15:
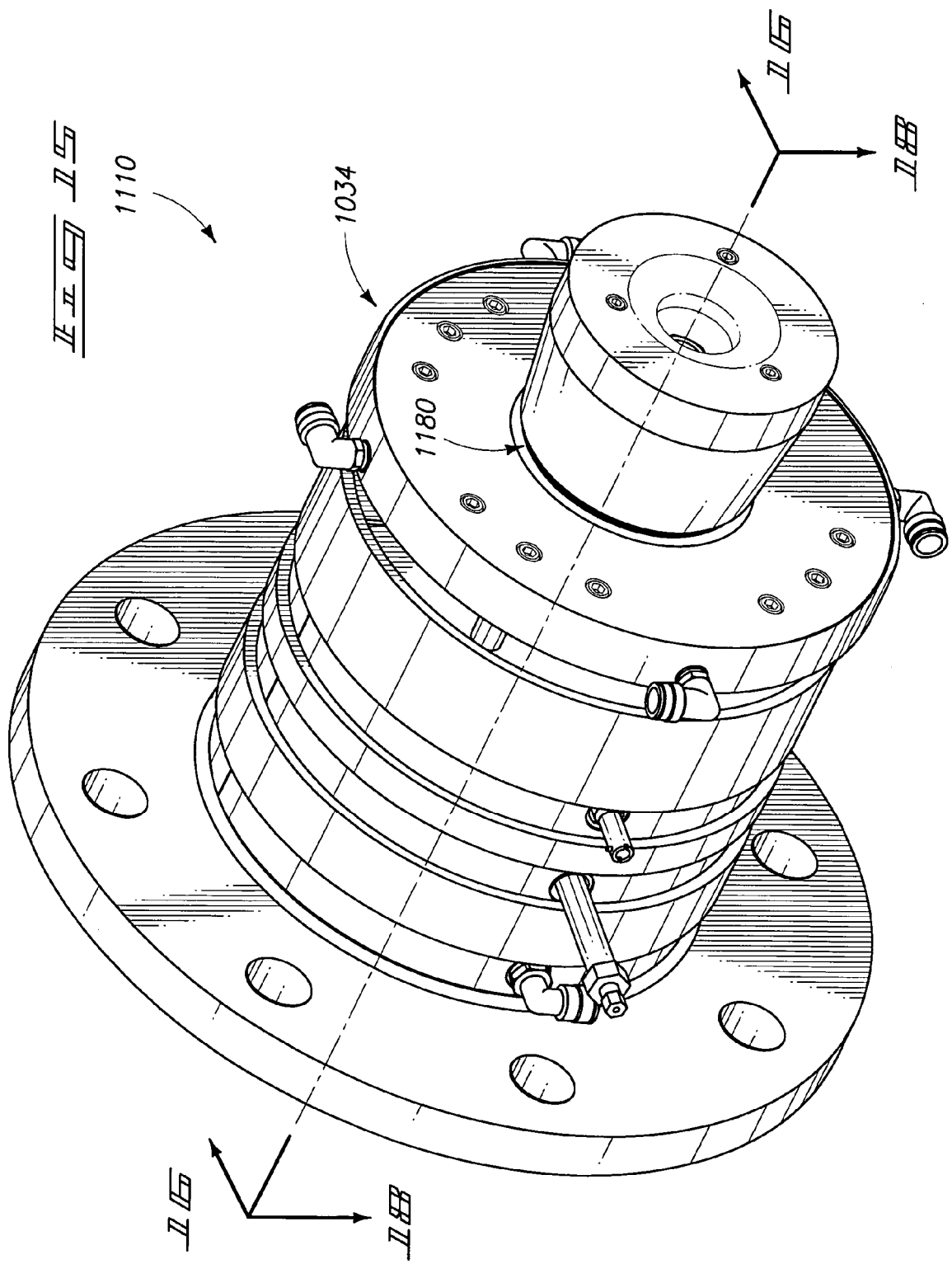
FIG. 15 is an enlarged perspective view of a second embodiment die assembly that substitutes for the die assembly of FIGS. 2 and 4-14.

As shown in FIG. 15, extruder die assembly 1110 has an adjustable, annular die gap 1180 that is provided downstream of a cooling air ring 1034. Assembly 1110 is mounted onto an extruder, such as extruder 100 (of FIGS. 2 and 4).

Figure 16:
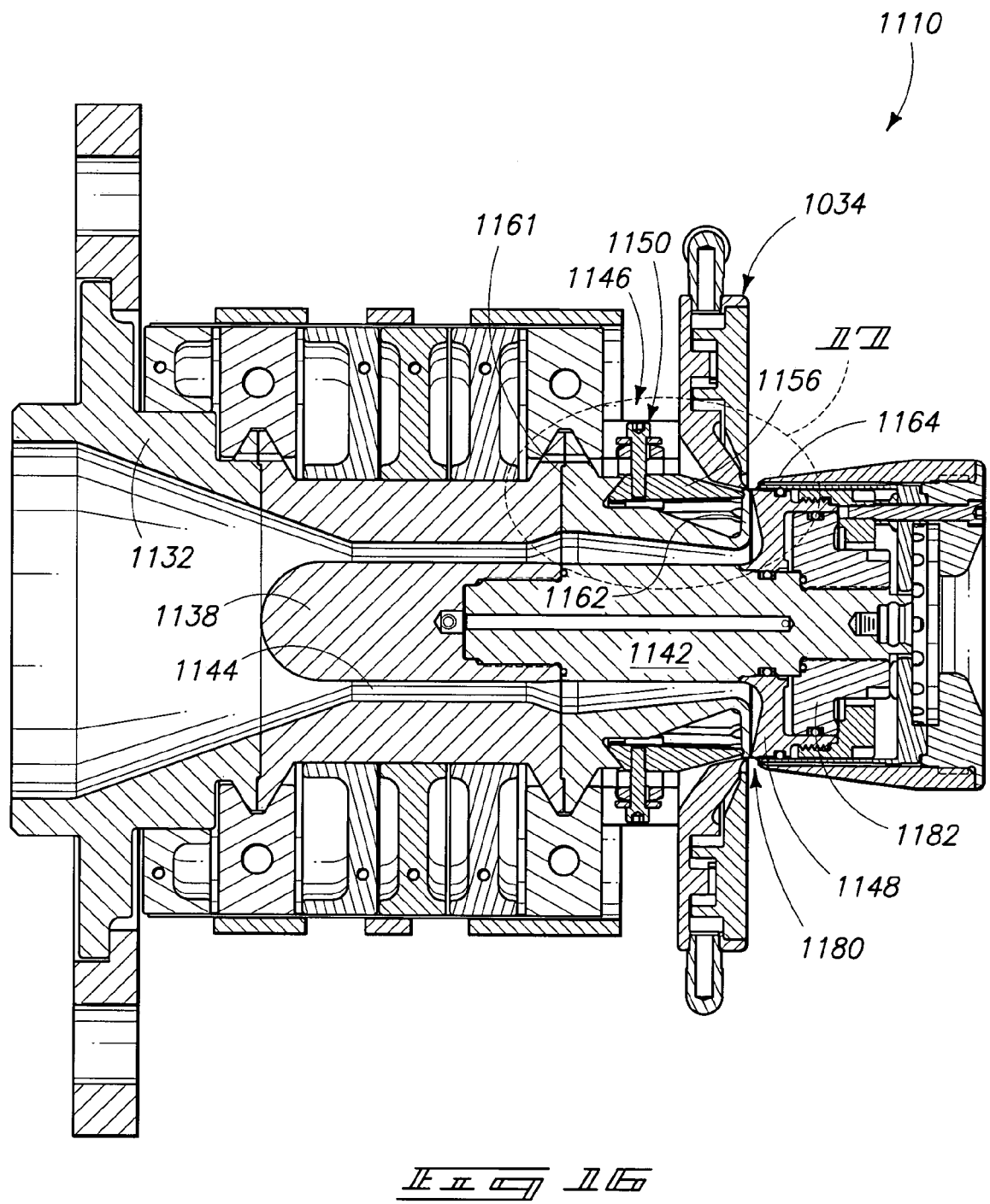
FIG. 16 is a vertical centerline sectional view taken in the direction of arrow 16 of FIG. 15 and further illustrating the die assembly.

FIG. 16 illustrates in greater detail provision of the die lip adjustment apparatus 1146 on extruder die assembly 1110. A three-piece adjuster support ring 1150 is provided in a manner similar to ring 150 (of FIG. 5). A plurality of circumferentially spaced-apart die lip adjuster paddles 1156 are supported about ring 1150 in a manner similar to paddles 156 (of FIGS. 5-10). Adjuster paddles 1156 coact against a sloped rear face on die body 1161 to locally deform outer die lip 1162 toward inner die lip 1164 in response to tightening of individual threaded adjuster bolts 1158 (see FIG. 17).

In operation, molten plastic is delivered in a downstream direction through an extruder and into a barrel 1132 where it passes into a gap provided by a spider core 1138 that is supported coaxially within a cylindrical bore 1144. Spider core 1138 is supported coaxially within bore 1144 via a pair of spider arms 1140 (see FIG. 18). Molten plastic is then delivered around a die shaft 1142 before exiting through an annular die gap 1180 provided between outer die lip 1162 and inner die lip 1164. Gap 1180 is provided adjacent and downstream of cooling air ring 1034. Individual paddles 1156 are adjusted after observing the thickness and uniformity of foam sheet product that exits gap 1180 in order to tailor the local gap dimension in order to achieve a sheet product with more uniform thickness. In the event material (or contaminants) needs to be cleaned from gap 1180, inner die lip 1164 is moved away from outer die lip 1162 by actuating die lip collar 1148 away from outer die lip 1162. Collar 1148 moves relative to end collar 1182.

Figure 17:
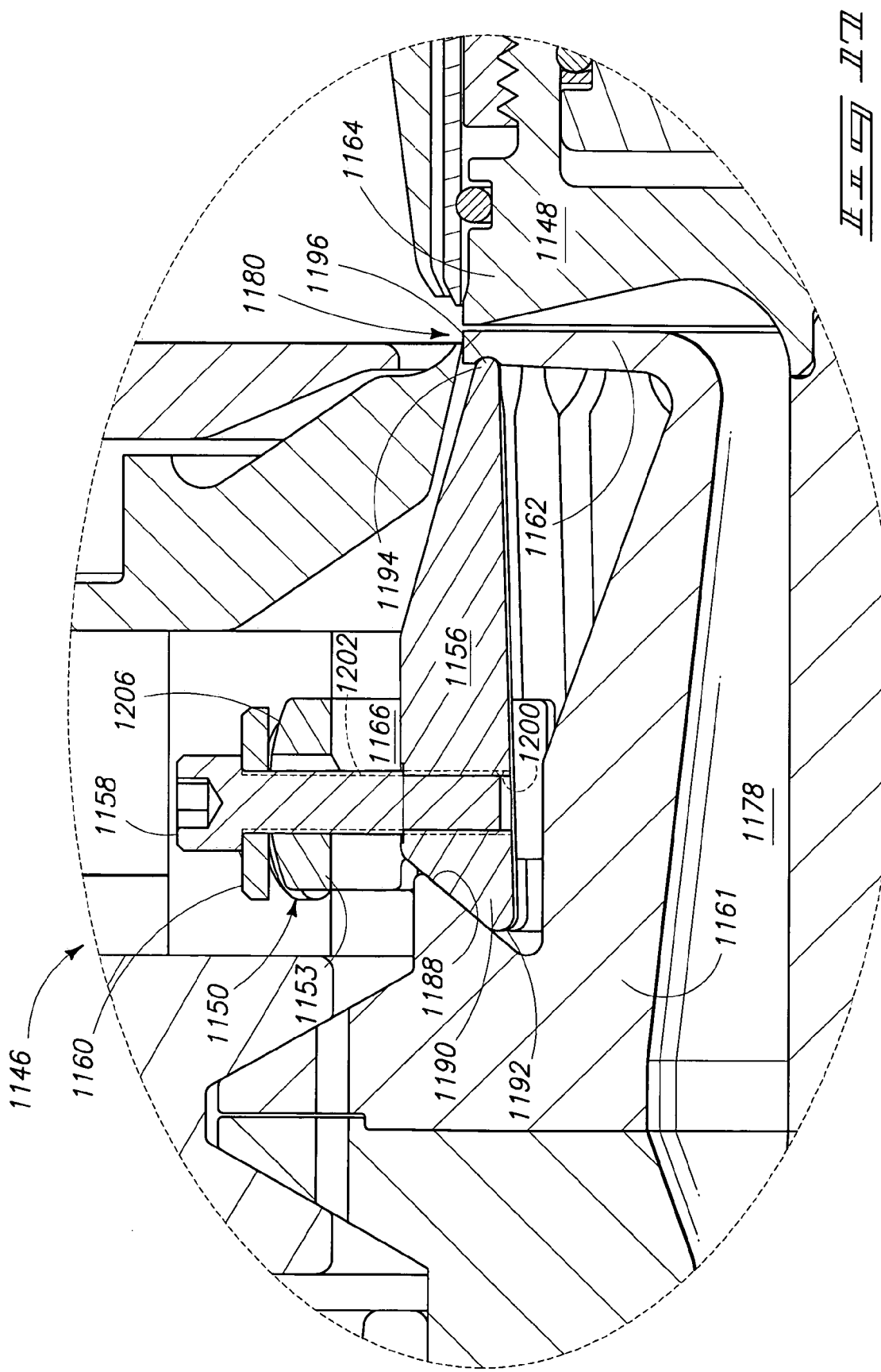
FIG. 17 is an enlarged sectional view taken from the encircled region 17 of FIG. 16 and showing a lip adjuster assembly in a relatively open operating position.

FIG. 17 illustrates in greater detail the construction and operation of die lip adjustment apparatus 1146. Apparatus 1146 includes an adjuster support ring 1150 comprising three arcuate ring members, such as member 1153. Ring 11500 encircles die body 1161 to guide and support a plurality of individual die lip adjuster paddles 1156 to apply local bending forces along outer die lip 1162 via annular groove 1196. Each paddle 1156 exerts a lateral bending force on lip 1162 to locally reduce the size of gap 1180 by deforming lip 1162 toward inner die lip 1164. Additionally, a die lip collar 1148 is moved toward lip 1162 via pneumatic fluid so as to define a nominal operating die gap 1180. Liquid plastic material is delivered from annular gap 1178 for ejection through annular die gap 1180. When a contaminant becomes lodged in gap 1180, the pneumatic pressure is decreased which enables collar 1148 and lip 1164 to move away from lip 1162, which increases the size of die gap 1180 and allows the contaminant to eject through gap 1180.

As shown in FIG. 17, die body 116 has a recess that provides a sloped back wall 1188. Each paddle 1156 is received in the recess, between the sloped back wall 1188 and annular groove 1196, with tip, or toe, 1194 being seated within groove 1196. Each paddle is guided for radial positioning via a slot 1166 in ring 1150. A complementary sloped back face 1190 of paddle 1156 engages with face 1188. Face 1190 extends upwardly from heel 1192. A threaded bore 1200 in each paddle 1156 receives a threaded portion 1202 of a respective adjuster bolt, or fastener, 1158. A washer 1160 is loaded onto each bolt 1158 before passing bolt 1158 through ring 1150 and into threaded portion 1200 of paddle 1156. Washer 1160 and bolt 1158 sit atop a rounded top surface 1206 of ring of ring 1150.

Figure 18:
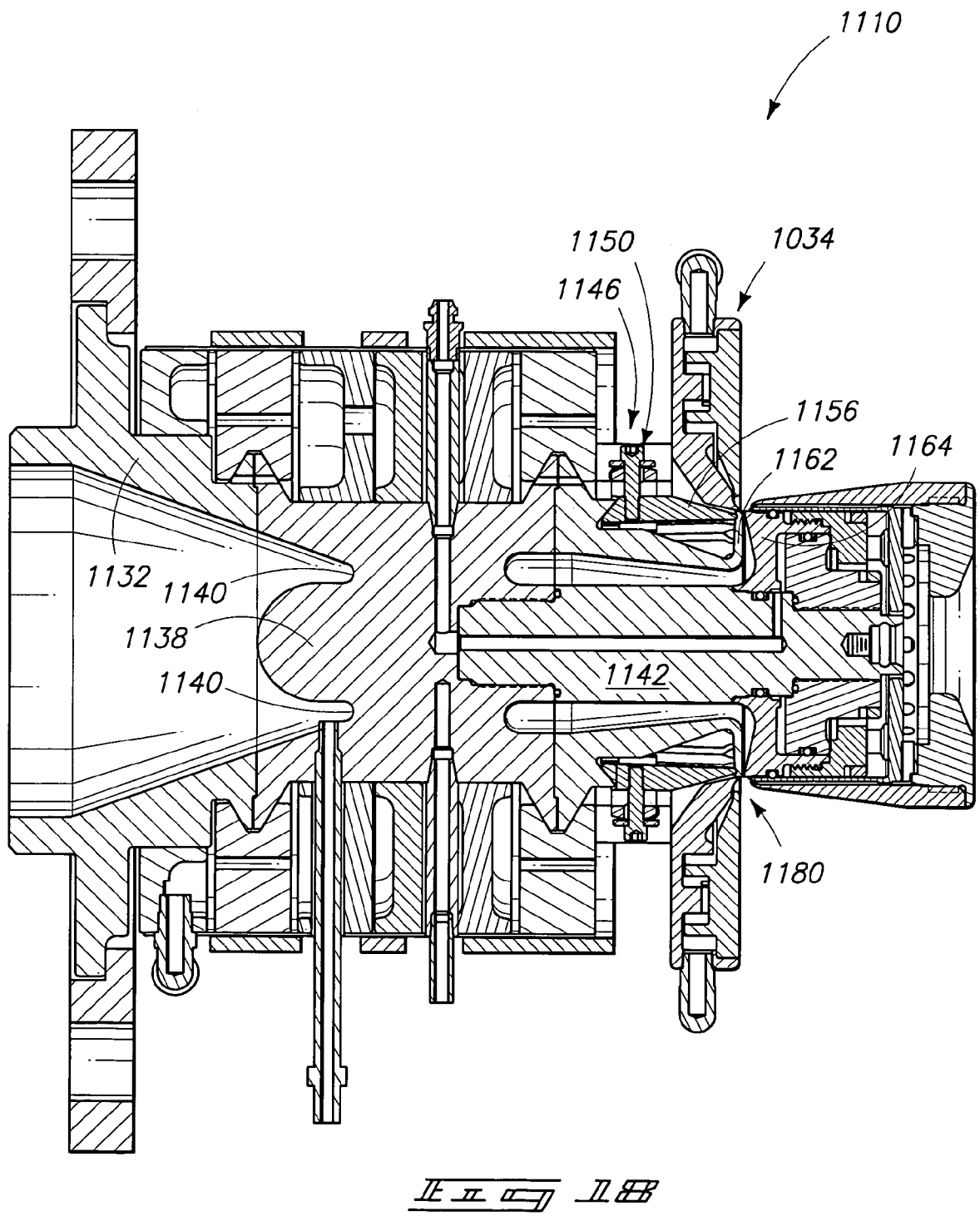
FIG. 18 is a centerline sectional view taken in the direction of arrow 18 of FIG. 16 and further illustrating the die assembly.

FIG. 18 further depicts construction of annular extruder die assembly 1110 with a pair of spider arms 1140 shown supporting spider core 1138 relative to barrel 1132. Die shaft 1142 is shown mounted to a downstream end of spider core 1138. Inner die lip 1164 is supported for axial movement from die shaft 1142 to enable opening of die gap 1180 between lips 1162 and 1164. Paddles 1156 of die lip adjustment apparatus 1146 are assembled onto adjuster support ring 1150, after which cooling air ring 1034 is assembled thereabout.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An annular thermoplastic foam extrusion die assembly, comprising:
   an annular die having a first die body with a first die lip and a second die body with a second die lip, the second die body positioned adjacent the first die body with the second die lip configured relative to the first die lip to form an annular die gap therebetween, the first die body including a trench having an undercut, sloped back wall and the first die lip having a circumferential groove opposite the back wall;
   a plurality of die lip paddles spaced apart about the annular die gap, each having a tip and a heel, the tip configured to be received for pivotal movement in the groove and the heel configured to engage with the back wall as the heel is raised to drive the first die lip toward the second die lip to adjust a local portion of the annular die gap formed therebetween;
   a lifting mechanism configured to independently raise and lower each of the paddles; and
   a guide member configured to guide each of the die lip paddles for positioning in a radial direction as each of the paddles is independently pivotally positioned about the annular groove.

2. The annular thermoplastic foam extrusion die assembly of claim 1 wherein the first die lip of the first die body comprises an outer die lip.

3. The annular thermoplastic foam extrusion die assembly of claim 2 wherein the outer die lip comprises a cylindrical outer die lip.

4. The annular thermoplastic foam extrusion die assembly of claim 1 wherein the second die lip of the second die body comprises an inner die lip.

5. The annular thermoplastic foam extrusion die assembly of claim 4 wherein the inner die lip comprises a cylindrical die lip.

6. The annular thermoplastic foam extrusion die assembly of claim 1 wherein the die lip paddle further comprises a tapering finger extending from the tip towards the heel.

7. The annular thermoplastic foam extrusion die assembly of claim 6 wherein the die lip paddle comprises a sloped back wall extending upwardly from the heel and configured to mate in complementary relation with the undercut, sloped back wall on the trench of the first die body.

8. The annular thermoplastic foam extrusion die assembly of claim 1 wherein the lifting mechanism comprises an adjuster support ring extending circumferentially about the first die body and configured to support the plurality of die lip paddles in circumferentially spaced-apart relation about the first die body.

9. The annular thermoplastic foam extrusion die assembly of claim 8 wherein the adjuster support ring comprises a plurality of arcuate ring members having individual slots configured to support a respective one of the die lip paddles for positioning inwardly and outwardly along the radial direction.

10. The annular thermoplastic foam extrusion die assembly of claim 9 further comprising bores provided in the ring members of the adjuster support ring about each slot and a threaded bolt configured to extend through the bore and into a tapped hole in a respective one of the die lip paddles configured to raise and lower the paddle relative to the collar responsive to threading engagement therebetween.

11. The annular thermoplastic foam extrusion die assembly of claim 8 wherein the guide member comprises a slot provided in the adjuster support ring formed in a radial direction and configured to guide a respective one of the die lip paddles in a radial raised and lowered direction as the paddle is pivotally positioned about the annular die gap.

12. A thermoplastic foam extrusion die assembly, comprising:
an annular die having a die body, a first die lip, and a second die lip, the second die lip spaced from the first die lip to provide an annular die gap there between, the die body including an undercut, sloped back wall and the first die lip having a circumferential groove opposing the back wall;
a plurality of die lip wedges, each wedge having a tip and a heel, the tip configured to be received for pivotal movement in the groove of the first die lip and the heel configured to engage with the back wall of the die body;
a collar encompassing the die body and having a plurality of guide slots spaced circumferentially about the die body each supporting one of the wedges; and
a lifting mechanism for independently raising and lowering individual ones of the wedges as the heel of a selected wedge is raised into engagement with the back wall to drive the first die lip toward the second die lip to adjust a local portion of the annular die gap formed therebetween.

13. The thermoplastic foam extrusion die assembly of claim 12 wherein the second die lip is supported by the die body for movement relative to the first die lip.

14. The thermoplastic foam extrusion die assembly of claim 12 wherein the wedge further comprises a tapering finger extending from the tip towards the heel.

15. The thermoplastic foam extrusion die assembly of claim 12 wherein the wedge comprises a sloped back wall extending upwardly from the heel and configured to mate in complementary relation with the undercut, sloped back wall on the die body.

16. The thermoplastic foam extrusion die assembly of claim 12 wherein the collar comprises a cylindrical collar having a plurality of arcuate collar members each having a plurality of arches, with each arch providing one of the guide slots.

17. The thermoplastic foam extrusion die assembly of claim 16 wherein the lifting mechanism comprises a threaded bolt configured to be received through a bore in one of the arches of the collar and configured to mate in threaded engagement with a threaded bore in one of the wedges.

18. An extrusion die for polymeric material, comprising:
a die having a die body, an outer die lip, and an inner die lip cooperating with the outer die lip to define an annular die gap, the die body including an undercut, sloped back wall and the outer die lip having a circumferential groove opposing the back wall;
a plurality of die lip wedges, each wedge having a tip and a heel, the tip configured to be received for pivotal movement in the groove of the first die lip and the heel configured to engage with the back wall of the die body;
a frame provided about the die body and having a plurality of slots spaced circumferentially about the die body to guide each of the wedges; and
a lifting mechanism for independently raising and lowering individual ones of the wedges, the heel of each selected wedge being raised into engagement with the back wall to drive the first die lip toward the second die lip to adjust an adjacent portion of the annular die gap.

19. The extrusion die of claim 18, wherein the frame comprises a collar, and the slots comprise guide slots each extending in a radial direction within the collar.

20. The extrusion die of claim 18, wherein the lifting mechanism comprises a plurality of arcuate ring members extending circumferentially about the die body including a plurality of bores spaced circumferentially about the die body and a plurality of threaded bolts each configured to extend through a respective bore and into a complementary tapped hole in a respective wedge and adjustable to raise and lower the wedge relative to the respective ring member.

* * * * *

UNITED STATES PATENT AND TRADEMARK OFFICE
CERTIFICATE OF CORRECTION

PATENT NO. : 7,296,991 B2  Page 1 of 1
APPLICATION NO. : 11/298442
DATED : November 20, 2007
INVENTOR(S) : Jere F. Irwin It is certified that error appears in the above-identified patent and that said Letters Patent is hereby corrected as shown below:

In Col. 3, line 14 replace "each of the, paddles" with --each of the paddles--

In Col. 9, line 45 replace "11500" with --1150--

In Col. 10, line 5 replace "surface 1206 of ring of ring 1150" with --surface 1206 of ring 1150--

Signed and Sealed this

Twenty-sixth Day of August, 2008

JON W. DUDAS
*Director of the United States Patent and Trademark Office*